(12) United States Patent
Ikegami et al.

(10) Patent No.: US 8,407,801 B2
(45) Date of Patent: Mar. 26, 2013

(54) SECURITY COUNTERMEASURE FUNCTION EVALUATION PROGRAM

(75) Inventors: Michiyo Ikegami, Fuchu (JP); Masue Shiba, Fuchu (JP); Hidehisa Takamizawa, Fuchu (JP); Masanobu Koike, Tama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 110 days.

(21) Appl. No.: 13/167,821

(22) Filed: Jun. 24, 2011

(65) Prior Publication Data
US 2011/0302657 A1   Dec. 8, 2011

Related U.S. Application Data

(63) Continuation of application No. PCT/JP2009/071344, filed on Dec. 22, 2009.

(30) Foreign Application Priority Data

Dec. 24, 2008   (JP) ................... 2008-328751

(51) Int. Cl.
*H04L 29/06* (2006.01)
(52) U.S. Cl. ........................................ 726/25
(58) Field of Classification Search ............. 726/25
See application file for complete search history.

(56) References Cited

U.S. PATENT DOCUMENTS

| | | | |
|---|---|---|---|
| 6,971,026 B1* | 11/2005 | Fujiyama et al. | 726/25 |
| 7,904,962 B1* | 3/2011 | Jajodia et al. | 726/25 |
| 8,201,257 B1* | 6/2012 | Andres et al. | 726/25 |
| 2002/0147803 A1* | 10/2002 | Dodd et al. | 709/223 |
| 2003/0028803 A1* | 2/2003 | Bunker et al. | 713/201 |
| 2003/0046128 A1* | 3/2003 | Heinrich | 705/7 |
| 2003/0093696 A1 | 5/2003 | Sugimoto | |
| 2004/0049372 A1* | 3/2004 | Keller | 703/22 |
| 2007/0067846 A1* | 3/2007 | McFarlane et al. | 726/25 |
| 2009/0100077 A1* | 4/2009 | Jung et al. | 707/100 |
| 2010/0043074 A1* | 2/2010 | Scates | 726/25 |

FOREIGN PATENT DOCUMENTS

| | | |
|---|---|---|
| JP | 2001-101135 A | 4/2001 |
| JP | 2002-24526 A | 1/2002 |
| JP | 2002-352062 A | 12/2002 |
| JP | 2003-150748 A | 5/2003 |
| JP | 2003-196476 A | 7/2003 |
| JP | 2005-25523 A | 1/2005 |
| JP | 2005-258512 A | 9/2005 |

OTHER PUBLICATIONS

International Search Report issed Feb. 2, 2010 in PCT/JP2009/071344, filed Dec. 22, 2009.
International Written Opinion issed Feb. 2, 2010 in PCT/JP2009/071344, filed Dec. 22, 2009.

* cited by examiner

Primary Examiner — Jeffrey D Popham
(74) *Attorney, Agent, or Firm* — Oblon, Spivak, McClelland, Maier & Neustadt, L.L.P.

(57) ABSTRACT

In a security countermeasure function evaluation apparatus, an estimator operates an input unit, whereby an evaluation point calculation unit makes an evaluation as to whether each item of countermeasure information representing a security countermeasure function in detail satisfies each item of sufficient condition table information, and the evaluation point is calculated from the evaluation result of each item, whereby the transition probability calculation unit calculates a transition probability based on the evaluation point.

5 Claims, 40 Drawing Sheets

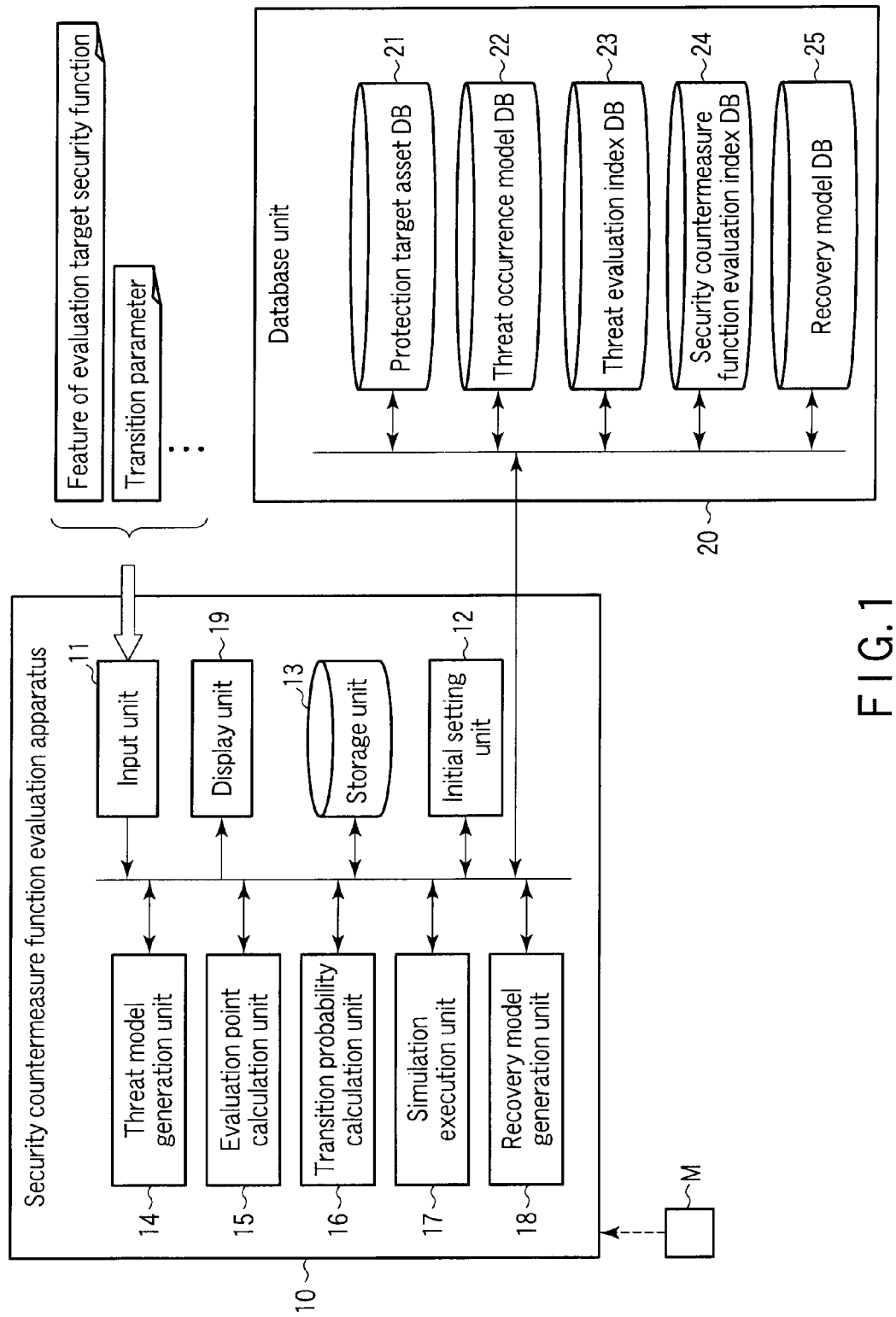
F I G. 1

| Physical body of information processing apparatus | Security state information | |
|---|---|---|
| | ID | State information |
| Notebook PC, Desktop PC, Portable telephone, Game machine, ..., CPU, Storage device, Input/output device, ... | P1 | Owner has information processing apparatus at hand |
| | P2 | Information processing apparatus is lent to somebody else |
| | P3 | Information processing apparatus is stored |
| | P4 | Information processing apparatus is discarded |
| | P5 | Information processing apparatus is left unattended |
| | P6 | Information processing apparatus is broken |
| | P7 | Information processing apparatus is lost |
| | P8 | Information processing apparatus is stolen |
| | ... | |

| Data stored in information processing apparatus | Security state information | |
|---|---|---|
| | ID | State information |
| Personal information, Entertainment Information (music, motion picture, and the like), Business related information, Sent/received mails, ... | D1 | Data are stored in information processing apparatus |
| | D2 | Data are on communication path |
| | D3 | Data are stored in server |
| | D4 | Data are stored in external storage medium |
| | D5 | Data are stored in information processing apparatus of third person |
| | D6 | Data are illegally printed |
| | D7 | Data are compromised |
| | D8 | Data are broken |
| | D9 | Data are lost |
| | D10 | Data are misused |
| | ... | |

| Function of information processing apparatus | Security state information | |
|---|---|---|
| | ID | State information |
| OS/BIOS, Command library, Operation setting, Document generation software/editor, Macro function, Browser / mail client, Music reproduction software, ... | M1 | Information processing apparatus is operating normally |
| | M2 | Information processing apparatus has virus |
| | M3 | Information processing apparatus is infected with virus |
| | M4 | Resource of information processing apparatus is broken |
| | M5 | Resource of information processing apparatus is used |
| | M6 | Information processing apparatus is causing damage to another person |
| | ... | |

Protection target asset DB

F I G. 2

| Evaluation parameter table | | | | | |
|---|---|---|---|---|---|
| Countermeasure function evaluation | Options | Points | Sufficient condition evaluation | Options | Points |
| Presence/non-presence of function | Function is present | 5 | Presence/non-presence of function | Essential | 5 |
| | Function is not present | 0 | | Better if function is provided | 0 |
| | | | | Irrelevant | 0 |
| Time | Fast | 5 | Time | Fast processing is essential | 5 |
| | Slow | 2 | | | |
| | Depending on the case | 0 | | Irrelevant | 0 |
| Effect | Sufficient | 5 | Effect | High | 5 |
| | Low | 0 | | Acceptable | 3 |
| | | | | Irrelevant | 0 |
| Notification range | Away | 5 | Notification range | Away | 5 |
| | Close proximity | 3 | | Close proximity | 3 |
| | Irrelevant | 0 | | Irrelevant | 0 |
| Operation timing | Periodical | 10000 | Operation timing | Periodical | 10000 |
| | At occurrence | 1000 | | Before occurrence | 1000 |
| | After occurrence | 100 | | At occurrence | 100 |
| Degree of dependence on booting | Possible at power off | 5 | Degree of dependence on booting | Power off is essential | 5 |
| | Irrelevant | 0 | | Irrelevant | 0 |

Security countermeasure function evaluation index DB

FIG. 3

| Countermeasure policy(prior to) suppression | Countermeasure execution | | | | | | | | | User notification function | | | | | | |
|---|---|---|---|---|---|---|---|---|---|---|---|---|---|---|---|---|
| | Operation timing | | Time | | Effect | | Degree of dependence on booting | | | Presence/ non-presence of function | | Notification range | | Operation timing | |
| | Selection result | Point | Selection result | Point | Selection result | Point | Selection result | Point | | Selection result | Point | Selection result | Point | Selection result | Point |
| | | | | | | | | | | | | | | | |
| | | | | | | | | | | | | | | | |
| | | | | | | | | | | | | | | | |
| | | | | | | | | | | | | | | | |

Sufficient condition table model-format information

Security countermeasure function evaluation index DB

24

F I G. 4

| Countermeasure model-format information |||||||||||
| --- | --- | --- | --- | --- | --- | --- | --- | --- | --- | --- |
| Countermeasure name | Target | User notification function |||| Timing || Countermeasure booting || ... |
| | | Presence/ non-presence of function | | Notification range || | | Power-off || |
| | | Selection result | Point | Selection result | Point | Selection result | Point | Selection result | Point | |

| Countermeasure model-format information |||||||||||
| --- | --- | --- | --- | --- | --- | --- | --- | --- | --- | --- |
| ... | ... | Warning function to violator |||| | Detection/notification target |||
| | | Presence/ non-presence of function | | Notification range || Timing || Only warning | Identification of user | Position/ distance | Lent | Others |
| | | Selection result | Point | Selection result | Point | Selection result | Point | | | | | |

FIG. 5

| Recovery sufficient condition table model-format information |||||||||
| ID | Recovery ||| Log |||| Tracking function | Backup | Others |
| | Countermeasure policy | Target | Position | User | Time | Storage location | Target | Target | Function |
| | | | | | | | | | |
| | | | | | | | | | |
| | | | | | | | | | |

F I G. 6

| | | Recovery (cause investigation) sufficient condition table model-form information | | | | |
|---|---|---|---|---|---|---|
| ID | Cause investigation | Log | | Tracking function | Backup | Others |
| | Countermeasure policy | Target | Storage location | Target | Target | |
| | | | | | | |
| | | | | | | |
| | | | | | | |
| | | | | | | |

FIG. 7

| Countermeasure name | Recovery countermeasure model-format information (recovery/cause investigation) | | | | | | | |
|---|---|---|---|---|---|---|---|---|
| | Log | | | | | Tracking function | Backup | Others |
| | Target | Position | User | Time | Storage location | Target | Target | Function |
| | | | | | | | | |
| | | | | | | | | |
| | | | | | | | | |

F I G. 8

| Security protection target asset | Security state | | |
|---|---|---|---|
| | Safe state | Dangerous state | Damage occurrence state |
| Physical body of information processing apparatus | (1) Information processing apparatus is under management of legitimate administrator, or (2) Information processing apparatus is discarded under management of legitimate administrator | Information processing apparatus is not under management of legitimate administrator | (1) Information processing apparatus is broken (2) Information processing apparatus is stolen, or (3) Information processing apparatus is lost |
| Function of information processing apparatus | Information processing apparatus is executed normally within range intended by legitimate administrator | Function may be executed beyond range intended by legitimate administrator (for example, information processing apparatus has computer virus) | (1) Information processing apparatus is infected with computer virus (2) Information processing apparatus is broken so that information processing apparatus cannot execute any function, or (3) Regardless of intention of legitimate administrator, damage is caused to another information processing apparatus and another person's asset included therein |
| Data stored in information processing apparatus | Data are present in information processing apparatus | (1) Data are viewed by a person other than legitimate administrator (2) Data are on communication path (3) Data are in apparatus other than information processing apparatus (4) Data are stored in external storage medium, or (5) Data are printed | (1) Information processing apparatus is broken (2) Information processing apparatus is stolen, or (3) Information processing apparatus is lost |

F I G. 10

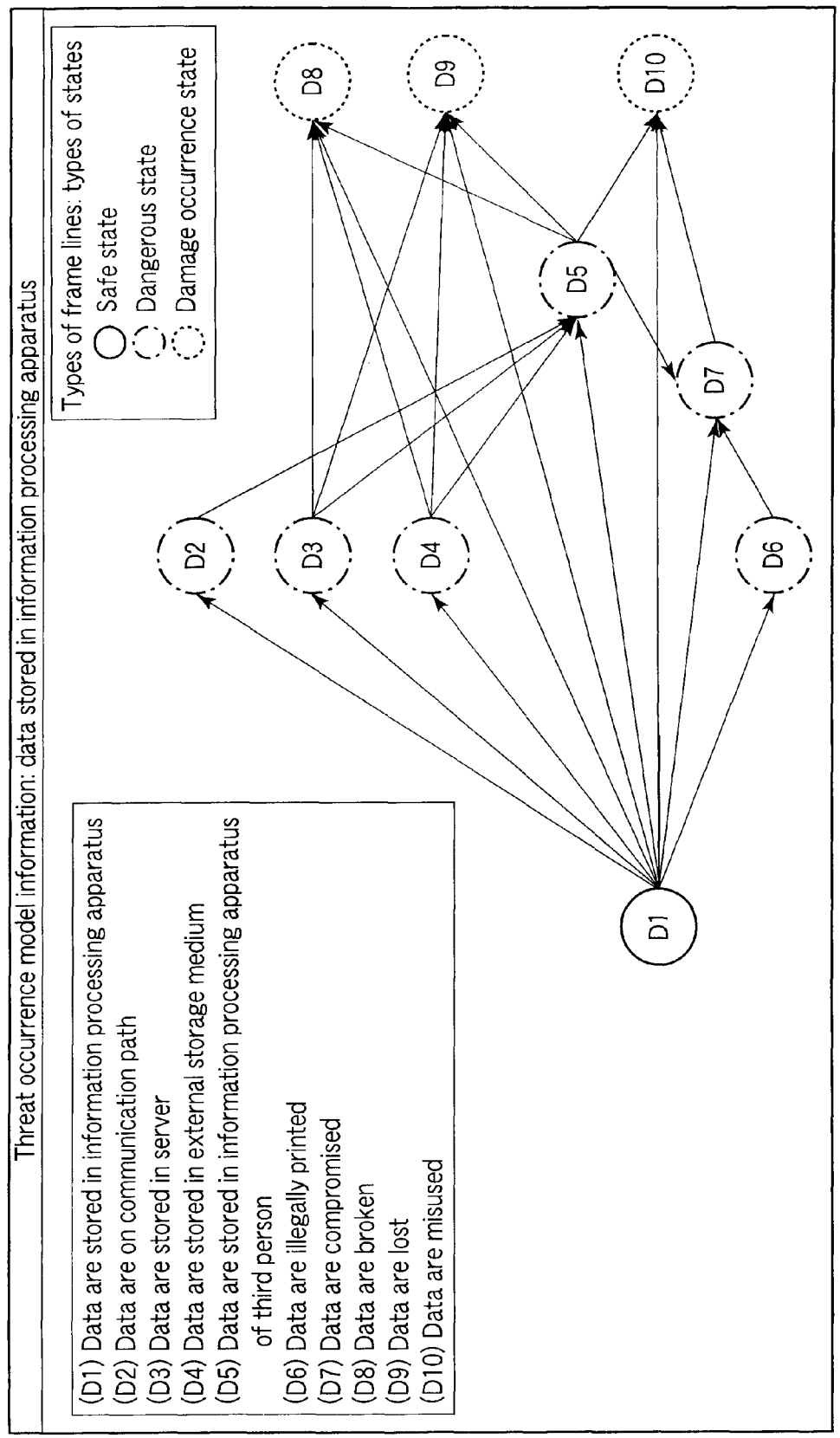
F I G. 13

Threat analysis result data: Physical body of information processing apparatus

| | Transition source security state information | Transition destination security state information | | Threat | |
|---|---|---|---|---|---|
| ID | State information | ID | State information | Who | How |
| P1 | Owner has information processing apparatus at hand | P2 | Lent | Owner | Information processing apparatus is lent to person involved |
| P1 | Owner has information processing apparatus at hand | P4 | Discarded | Owner | Information processing apparatus is no longer necessary |
| P1 | Owner has information processing apparatus at hand | P5 | Left unattended | Owner | Away from information processing apparatus |
| P1 | Owner has information processing apparatus at hand | P5 | Left unattended | Owner | Information processing apparatus is left behind |
| P1 | Owner has information processing apparatus at hand | P9 | Stolen | Violator | Violator approaches information processing apparatus while owner turns away from it |
| P1 | Owner has information processing apparatus at hand | P9 | Stolen | Violator | Violator commits fraud on owner |
| P1 | Owner has information processing apparatus at hand | P9 | Stolen | Violator | Violator robs information processing apparatus |
| P1 | Owner has information processing apparatus at hand | P7 | Broken | Owner | Spill water or powder |
| P1 | Owner has information processing apparatus at hand | P7 | Broken | Natural | Contaminated by particles outdoors |
| P1 | Owner has information processing apparatus at hand | P7 | Broken | Owner | Execute high-load program during booting process |
| .. | .. | .. | .. | .. | .. |

F I G. 14

| Transition source security state information | Transition destination security state information | | Threat | | | |
|---|---|---|---|---|---|---|
| | | | | | | |
| ID | State information | ID | State information | Who | How | Network |
| M1 | Operating normally | M2 | Have virus | Violator | Send virus mail to user | ON |
| M1 | Operating normally | M2 | Have virus | Violator | Send virus mail to user | ON |
| M1 | Operating normally | M2 | Have virus | Third person | Send virus mail to user by mistake | ON |
| M1 | Operating normally | M2 | Have virus | Third person | Send virus mail to user by mistake | ON |
| M1 | Operating normally | M2 | Have virus | Owner | View Web site infected with virus | ON |
| M1 | Operating normally | M2 | Have virus | Renter | View Web site infected with virus | ON |
| M1 | Operating normally | M2 | Have virus | Owner | Access shared folder infected with virus | ON |
| M1 | Operating normally | M2 | Have virus | Renter | Access shared folder infected with virus | ON |
| M1 | Operating normally | M2 | Have virus | Owner | Read medium infected with virus | any |
| M1 | Operating normally | M2 | Have virus | Renter | Read medium infected with virus | any |
| M1 | Operating normally | M2 | Have virus | Violator | From Web site infected with virus | ON |
| M1 | Operating normally | M2 | Have virus | Violator | From shared folder infected with virus | ON |
| ⋮ | ⋮ | ⋮ | ⋮ | ⋮ | ⋮ | ⋮ |

Threat analysis result data: function of information processing apparatus

F I G. 15

| Countermeasure policy (prior to) suppression | Sufficient condition table information ||||||||||||||
|---|---|---|---|---|---|---|---|---|---|---|---|---|---|---|
| | Countermeasure execution |||||||| User notification function ||||||
| | Operation timing || Time || Effect || Degree of dependence on booting || Presence/ non-presence of function || Notification range || Operation timing |
| | Selection result | Point | Selection result | Point | Selection result | Point | Selection result | Point | Selection result | Point | Selection result | Point | Selection result |
| PB1 Urge owner not to forget that he/she lent information processing apparatus | Periodical | 2 | Irrelevant | 0 | Moderate effect | 3 | Irrelevant | 0 | Essential | 5 | Away | 5 | Periodical |
| PB2 Restrict user of leaving desk | When threat occurs | 3 | Fast processing is essential | 5 | Moderate effect | 3 | Power off is essential | 5 | Better if provided | 0 | Irrelevant | 0 | |
| PB3 Urge owner not to leave information processing apparatus | When threat occurs | 3 | Irrelevant | 0 | Moderate effect | 3 | Irrelevant | 0 | Essential | 5 | Close proximity | 3 | When threat occurs |
| PB4 Restrict user of turning away from information processing apparatus | When threat occurs | 3 | Fast processing is essential | 5 | Moderate effect | 3 | Irrelevant | 0 | Essential | 5 | Close proximity | 3 | When threat occurs |
| PB5 Prevent user from being deceived by violator | When threat occurs | 3 | Irrelevant | 0 | Moderate effect | 3 | Irrelevant | 0 | Essential | 5 | Close proximity | 3 | When threat occurs |
| PB6 Deter violator from robbing | When threat occurs | 4 | Fast processing is essential | 5 | High effect | 5 | Power off is essential | 5 | Irrelevant | 0 | Irrelevant | 0 | |
| .. | .. | .. | .. | .. | .. | .. | .. | .. | .. | .. | .. | .. | .. |

F I G. 16

| | Countermeasure policy (prior to) suppression | Sufficient condition table information ||||||||||||
| | | Countermeasure execution |||||||| User notification function ||||
| | | Operation timing || Time || Effect || Degree of dependence on booting || Presence/non-presence of function || Notification range || Operation timing |
| | | Selection result | Point | Selection result | Point | Selection result | Point | Selection result | Point | Selection result | Point | Selection result | Point | Selection result |
| ... | ... | ... | ... | ... | ... | ... | ... | ... | ... | ... | ... | ... | ... | ... |
| PB7 | Prevent user from spilling water or powder | When threat occurs | 3 | Fast processing is essential | 5 | High effect | 5 | Power off is essential | 5 | Irrelevant | 0 | Irrelevant | 0 | |
| PB8 | Restrict taking information processing apparatus outdoors | When threat occurs | 3 | Fast processing is essential | 5 | Moderate effect | 3 | Power off is essential | 5 | Essential | 5 | Away | 3 | When threat occurs |
| PB9 | Restrict activation of high-load program | When threat occurs | 4 | Fast processing is essential | 5 | High effect | 5 | | 0 | Better if provided | 0 | Irrelevant | 0 | |
| PB10 | Restrict program that may cause malfunction | When threat occurs | 4 | Fast processing is essential | 5 | High effect | 5 | | 0 | Better if provided | 0 | Irrelevant | 0 | |
| PB11 | Urge user not to drop information processing apparatus | When threat occurs | 3 | Fast processing is essential | 5 | High effect | 5 | Power off is essential | 5 | Irrelevant | 0 | Irrelevant | 0 | |
| PB12 | Limit internal electrical current | When threat occurs | 3 | Fast processing is essential | 5 | High effect | 5 | Power off is essential | 5 | Irrelevant | 0 | Irrelevant | 0 | |
| ... | ... | ... | ... | ... | ... | ... | ... | ... | ... | ... | ... | ... | ... | ... |

| | Countermeasure policy (prior to) suppression | Sufficient condition table information | | | | | | | | | | | | | |
|---|---|---|---|---|---|---|---|---|---|---|---|---|---|---|---|
| | | Countermeasure execution | | | | | | | | | User notification function | | | | |
| | | Operation timing | | Time | | Effect | | Degree of dependence on booting | | Presence/ non-presence of function | | Notification range | | Operation timing | |
| | | Selection result | Point | Selection result | Point | Selection result | Point | Selection result | Point | Selection result | Point | Selection result | Point | Selection result | Point |
| .. | .. | .. | .. | .. | .. | .. | .. | .. | .. | .. | .. | .. | .. | .. | .. |
| PB13 | Urge owner not to forget whom information processing apparatus is lent to | Periodical | 2 | Irrelevant | 0 | Moderate effect | 3 | Irrelevant | 0 | Essential | 5 | Away | 5 | Periodical | |
| PB14 | limit violator from entering into a room | When threat occurs | 3 | Irrelevant | 0 | Moderate effect | 3 | Power off is essential | 5 | Irrelevant | 0 | Irrelevant | 0 | | |
| PB15 | Urge owner not to forget where information processing apparatus is placed | When threat occurs | 3 | Irrelevant | 0 | High effect | 5 | Irrelevant | 0 | Essential | 5 | Away | 5 | Periodical | |
| PB16 | Do not allow violator to come into proximity | When threat occurs | 3 | Fast processing is essential | 5 | Moderate effect | 3 | Power off is essential | 5 | Essential | 5 | Irrelevant | 3 | Before threat occurs | |
| PB17 | Do not allow others to take owner's information processing apparatus | When threat occurs | 3 | Fast processing is essential | 5 | Moderate effect | 3 | Power off is essential | 5 | Essential | 5 | Away | 5 | Before threat occurs | |
| .. | .. | .. | .. | .. | .. | .. | .. | .. | .. | .. | .. | .. | .. | .. | .. |

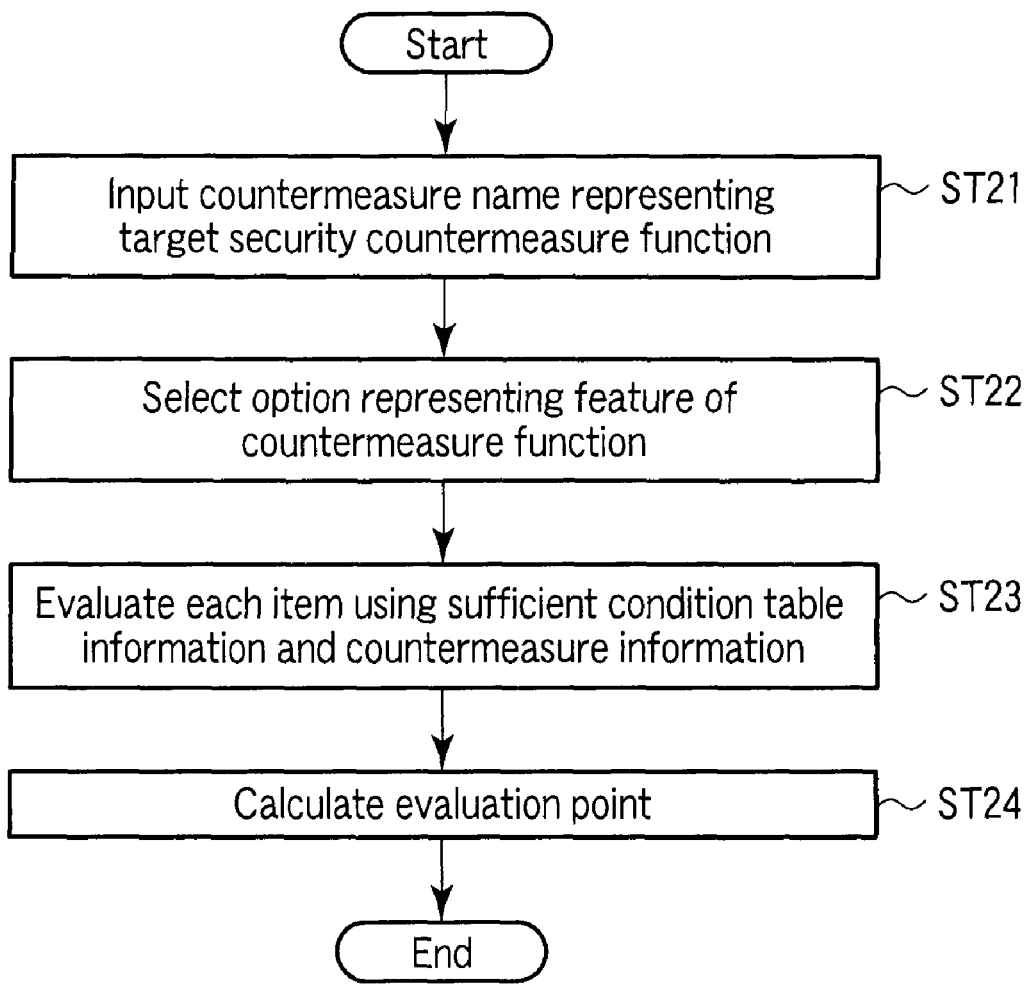
F I G. 19

| Countermeasure name | Target | Evaluation point for each target policy ||||
|---|---|---|---|---|---|
| | | User notification function | ... | Violator warning function | Evaluation point (product of all mean values) |
| Kensington lock | PC main body | Mean value of evaluation result | ... | Mean value of evaluation result | |
| Countermeasure policy ID | Countermeasure policy (before) | | | | |
| PB1 | Urge owner not to forget that he/she lent information processing apparatus | 0 | ... | 1 | 0 |
| PB2 | Restrict user of leaving desk | 0 | ... | 1 | 0 |
| PB3 | Urge owner not to leave information processing apparatus | 0 | ... | 1 | 0 |
| PB4 | Restrict user of turning away from information processing apparatus | 0 | ... | 1 | 0 |
| PB5 | Prevent user from being deceived by violator | 0 | ... | 1 | 0 |
| PB6 | Deter violator from robbing | 1 | ... | 1 | 1 |
| PB7 | Prevent user from spilling water or powder | 0 | ... | 1 | 0 |
| PB8 | Restrict taking information processing apparatus outdoors | 1 | ... | 1 | 1 |
| PB9 | Restrict activation of high-load program | 0 | ... | 1 | 0 |
| PB10 | Restrict program that may cause malfunction | 0 | ... | 1 | 0 |
| PB11 | Urge user not to drop information processing apparatus | 1 | ... | 1 | 1 |
| ... | ... | ... | ... | ... | ... |

F I G. 22

| Transition source state | Transition destination state | Transition parameter | | | | |
|---|---|---|---|---|---|---|
| | | Threat (before countermeasure) | Threat (after countermeasure) | Threat (recovery) | Summation of evaluation points | The number of recoveries |
| P0 | P1 | 1 | 1 | 0 | 0 | 0 |
| P0 | P2 | 0 | 0 | 1 | 0 | 0 |
| P0 | P3 | 1 | 1 | 0 | 0 | 0 |
| P0 | P4 | 0 | 0 | 1 | 0 | 0 |
| P0 | P5 | 0 | 0 | 1 | 0 | 0 |
| P0 | P7 | 0 | 0 | 1 | 0 | 0 |
| P0 | P8 | 0 | 0 | 1 | 0 | 0 |
| P0 | P9 | 0 | 0 | 1 | 0 | 0 |
| P1 | P1 | 1 | 3.5 | 0 | 0 | 0 |
| P1 | P2 | 1 | 1 | 0 | 0 | 0 |
| P1 | P3 | 0 | 0 | 0 | 0 | 0 |
| P1 | P4 | 1 | 1 | 0 | 0 | 0 |
| P1 | P5 | 2 | 2 | 0 | 0 | 0 |
| P1 | P7 | 8 | 7 | 0 | 1 | 0 |
| P1 | P8 | 3 | 1.5 | 0 | 1.5 | 0 |
| P2 | P1 | 0 | 0 | 1 | 0 | 1 |
| P2 | P2 | 1 | 4 | 1 | 0 | 0 |
| ... | ... | ... | ... | ... | ... | ... |
| a1 | a2 | a3 | a4 | a5 | a6 | a7 |

Calculation table of transition probabilities prior to countermeasure

| Transition source state | Transition destination state | Rate of transition | Numerator of transition probability | Denominator of transition probability | Transition probability | Transition probability (total value) | The number of successful passes | Probability of successful passes |
|---|---|---|---|---|---|---|---|---|
| P0 | P1 | 1 | 1 | 2 | 0.5 | 0.5 | | |
| P0 | P3 | 1 | 0 | 2 | 0.5 | 1 | | |
| P1 | P1 | 1 | 1 | 16 | 0.0625 | 0.0625 | | |
| P1 | P2 | 1 | 1 | 16 | 0.0625 | 0.125 | | |
| P1 | P4 | 1 | 1 | 16 | 0.0625 | 0.1875 | | |
| P1 | P5 | 2 | 2 | 16 | 0.0125 | 0.3125 | | |
| P1 | P7 | 8 | 8 | 16 | 0.5 | 0.8125 | | |
| P1 | P8 | 3 | 3 | 16 | 0.1875 | 1 | | |
| P2 | P2 | 1 | 1 | 1 | 1 | 1 | | |
| .. | .. | .. | .. | .. | .. | .. | | |
| b1 | b2 | b3 | b4 | b5 | b6 | b7 | b8 | b9 |

Calculation table of transition probabilities after countermeasure

| Transition source state | Transition destination state | Rate of transition | Numerator of transition probability | Denominator of transition probability | Transition probability | Transition probability (total value) | The number of successful passes | Probability of successful passes |
|---|---|---|---|---|---|---|---|---|
| P0 | P1 | 1 | 1 | 2 | 0.5 | 0.5 | | |
| P0 | P3 | 1 | 1 | 2 | 0.5 | 1 | | |
| P1 | P1 | 3.5 | 3.5 | 16 | 0.21825 | 0.21875 | | |
| P1 | P2 | 1 | 1 | 16 | 0.0625 | 0.28125 | | |
| P1 | P4 | 1 | 1 | 16 | 0.0625 | 0.34375 | | |
| P1 | P5 | 2 | 2 | 16 | 0.0125 | 0.46875 | | |
| P1 | P7 | 7 | 7 | 16 | 0.4375 | 0.90625 | | |
| P1 | P8 | 1.5 | 1.5 | 16 | 0.9375 | 1 | | |
| .. | .. | .. | .. | .. | .. | .. | | |
| b1 | b2 | b3' | b4' | b5' | b6' | b7' | b8' | b9' |

F I G. 25

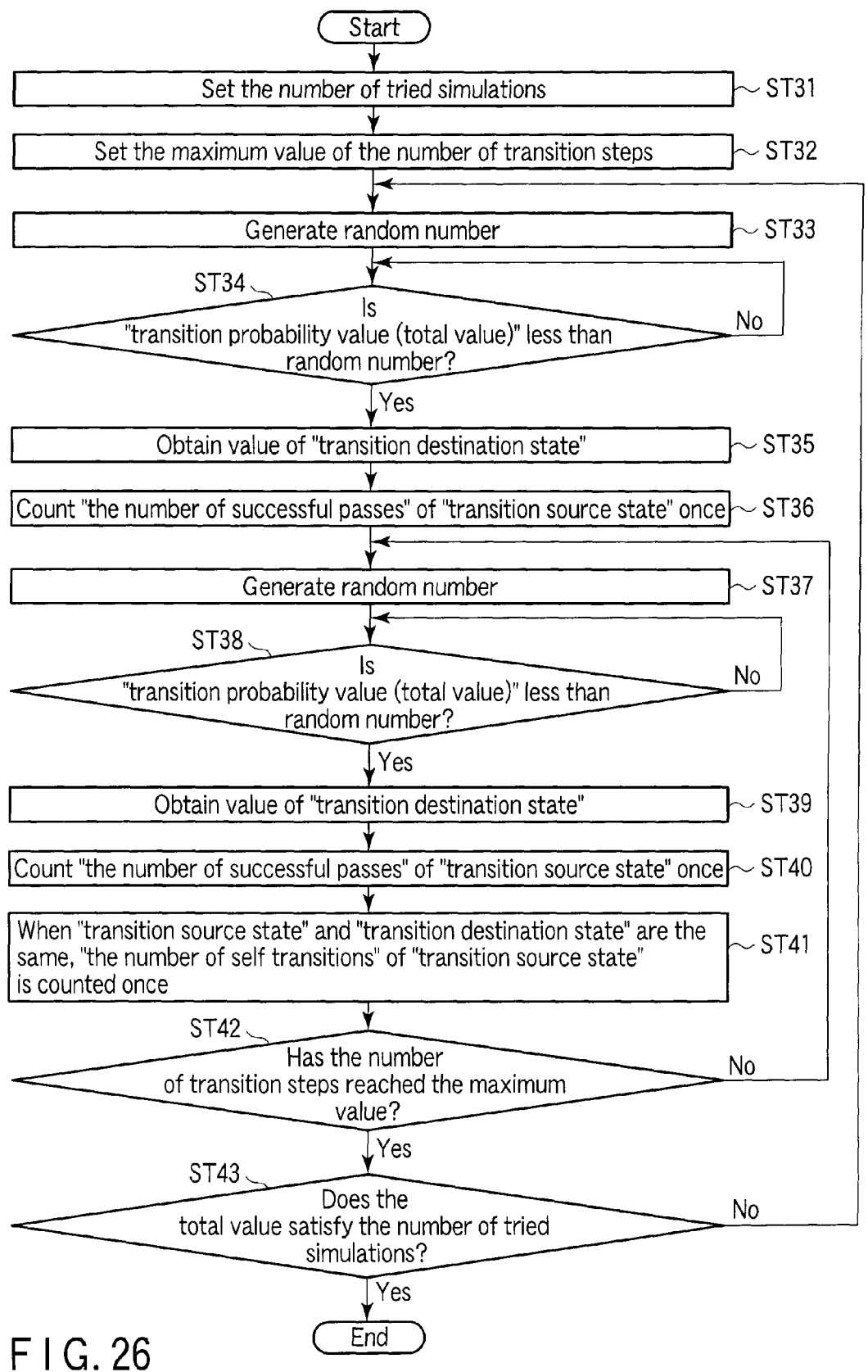
F I G. 26

| State | Simulation result before countermeasure | | | | | | |
|---|---|---|---|---|---|---|---|
| | The ultimate number of times the destination state is reached | Ultimate destination reaching probability | The number of successful passes | Probability of successful passes | The number of self transitions | Self transition probability (measured value) | Self transition probability (theoretical value) |
| P0 | 0 | 0 | 0 | 0 | 0 | 0 | 0 |
| P1 | 0 | 0 | 503 | 0.503 | 30 | 0.0563 | 0.0625 |
| P2 | 1 | 0.001 | 38 | 0.038 | 4 | 0.0976 | 0.0667 |
| P3 | 5 | 0.005 | 497 | 0.497 | 127 | 0.2052 | 0.2 |
| P4 | 37 | 0.037 | 37 | 0.037 | 72 | 1 | 1 |
| P5 | 5 | 0.005 | 74 | 0.074 | 22 | 0.2418 | 0.25 |
| P7 | 425 | 0.425 | 425 | 0.425 | 756 | 1 | 1 |
| P8 | 267 | 0.267 | 267 | 0.267 | 439 | 1 | 1 |
| P9 | 260 | 0.26 | 260 | 0.260 | 449 | 1 | 1 |
| ~c1 | ~c2 | ~c3 | ~c4 | ~c5 | ~c6 | ~c7 | ~c8 |

F I G. 27

| State | Simulation result after countermeasure | | | | | | Self transition probability (theoretical value) |
|---|---|---|---|---|---|---|---|
| | The ultimate number of times the destination state is reached | Ultimate destination reaching probability | The number of successful passes | Probability of successful passes | The number of self transitions | Self transition probability (measured value) | |
| P0 | 0 | 0 | 0 | 0 | 0 | 0 | 0 |
| P1 | 4 | 0.004 | 474 | 0.474 | 145 | 0.2358 | 0.2188 |
| P2 | 7 | 0.007 | 39 | 0.039 | 14 | 0.3043 | 0.2667 |
| P3 | 39 | 0.039 | 526 | 0.526 | 339 | 0.4104 | 0.4 |
| P4 | 46 | 0.046 | 46 | 0.046 | 83 | 1 | 1 |
| P5 | 15 | 0.015 | 90 | 0.090 | 26 | 0.2418 | 0.25 |
| P7 | 469 | 0.469 | 469 | 0.469 | 712 | 1 | 1 |
| P8 | 168 | 0.168 | 168 | 0.168 | 236 | 1 | 1 |
| P9 | 252 | 0.252 | 252 | 0.252 | 381 | 1 | 1 |
| c1 | c2' | c3' | c4' | c5' | c6' | c7' | c8' |

F I G. 28

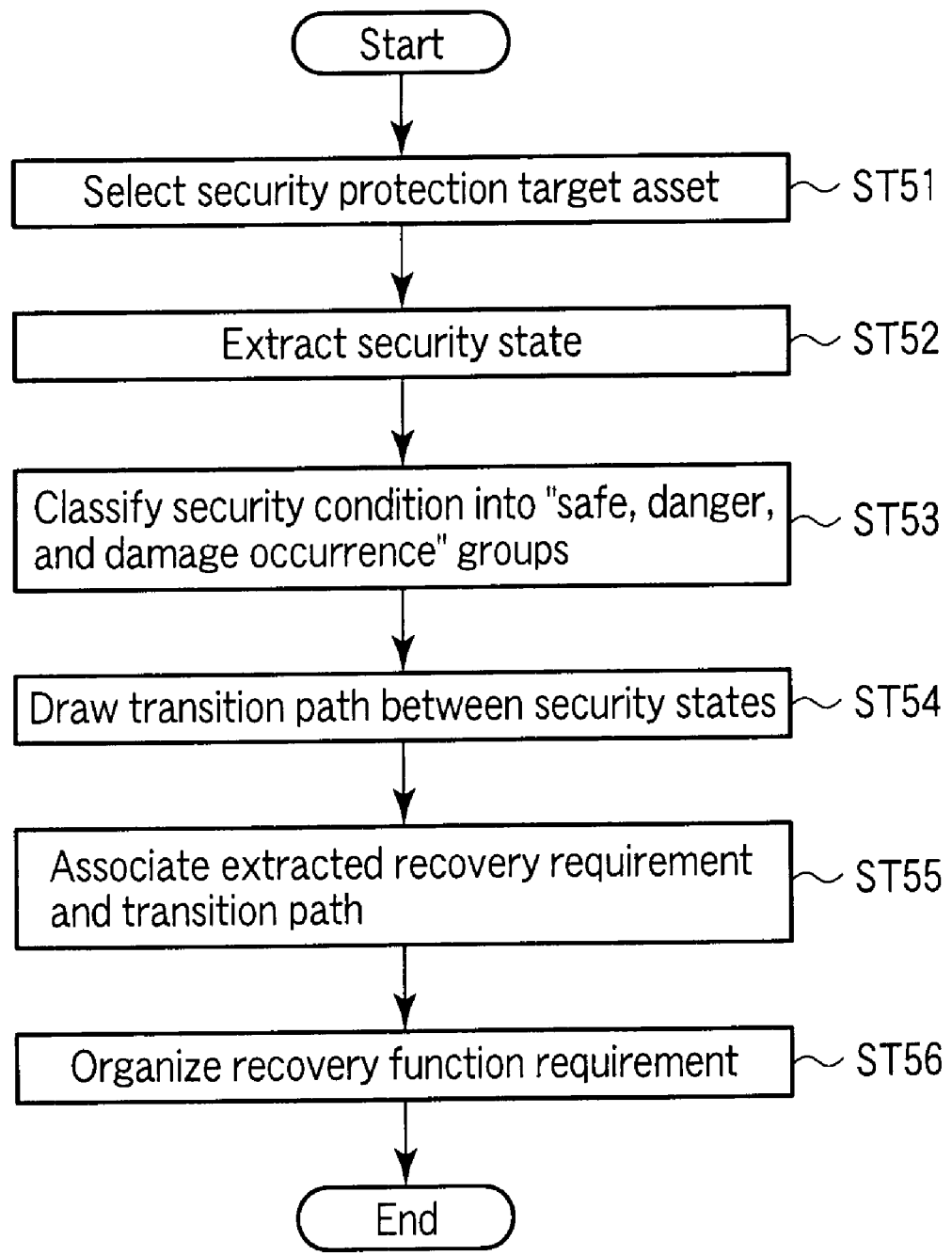
F I G. 30

Recovery sufficient condition table information

| ID | Recovery | | Log | | | | Tracking function | Backup | Others |
|---|---|---|---|---|---|---|---|---|---|
| | Countermeasure policy | Target | Position | User | Time | Storage location | Target | Target | Function |
| PR1 | Recover PC | | | | | | PC main body | | |
| PR2 | Repair broken PC | | | | | | | Alternative component | |
| MR1 | Remove virus from information processing apparatus | | | | | | | Normal operation recovery function | |
| MR2 | Recover broken thing (resource) | | | | | | | Normal operation recovery function | |
| MR3 | Stop process using resource | | | | | | | | Stop illegal process |
| DR1 | Invalidate data in PC of third person | | | | | | PC of third person | | Data invalidation means |
| DR2 | Invalidate compromised data | | | | | | | | Data invalidation means |
| DR3 | Recover broken data | | | | | | | Data | |
| DR4 | Track lost data | | | | | | Data search | | |
| DR5 | Recover lost data | | | | | | | Data | |
| DR6 | Invalidate lost data | | | | | | | | Data invalidation means |
| DR7 | (Track lost external storage medium) | | | | | | External storage medium | | |
| DR8 | (Invalidate misused data) | | | | | | | | Data invalidation means |

F I G. 34

F I G. 35

| ID | Recovery sufficient condition table information | | | | | | |
|---|---|---|---|---|---|---|---|
| | Cause investigation | Log | | | | Backup | Others |
| | Countermeasure policy | Target | | Storage location | Tracking function Target | | |
| PC1 | Position information (lending record) | Lending record | Position | | | Target | |
| PC2 | (Discard record) | Discard record | | Used hours | Outside of PC | PC main body | |
| PC3 | Distance/time with respect to owner | | Position | | | PC main body | |
| PC4 | Line of vision of owner | | | | | | The degree of concentration of valid users (lines of visions) |
| PC5 | Position information/distance from owner and the like | | Position | | | PC main body | |
| PC6 | Signs of water and powder | Water, powder | | | | | |
| PC7 | Repair log (normal operation) | Operation | | | | | |
| PC8 | Signs of shock (information confirmed with user) | Signs of shock | | User Used hours | | | |
| PC9 | Signs of shock (recording of disaster) | Recording of disaster | | | Outside of PC | | |
| PC10 | Signs of shock / bruise | Signs of shock | | | | | |
| PC11 | Signs of burn out and the like due to excessive current | Burn out | | | | | |

| Countermeasure name | Recovery countermeasure information (recovery/ cause investigation) ||||||||
| --- | --- | --- | --- | --- | --- | --- | --- | --- |
| | | Log |||| Tracking function | Backup | Others |
| | Target | Position | User | Time | Storage location | Target | Target | Function |
| Recovery countermeasure 1 | | Position | | Used hours | | External recording medium | Alternative component | |
| Cause investigation 1 | Water, powder | Position | | | | | | |

FIG. 36

| Example of evaluation result (1 : OK, 0 : NG) | Comparison result | Countermeasure information | Countermeasure information |
|---|---|---|---|
| 1 | Matched | ○○ is possible | ○○ is possible |
| 0 | Not matched | ×× is possible | ○○ is possible |
| 0 | Not matched | (Nil) | ○○ is possible |
| 1 | No condition | ○○ is possible | (Nil) |
| 1 | No condition | (Nil) | (Nil) |

| Countermeasure name | Recovery | | | | | | | | | Evaluation point (product of all evaluation result) |
|---|---|---|---|---|---|---|---|---|---|---|
| | Countermeasure policy | Recovery countermeasure 1 | | | | | | | | |
| | | | | Log | | Time | Storage location | Tracking function | Backup | Others |
| | | Target | Position | User | | Used hours | | Target | Target | Function |
| | | | Position | | | | | External storage medium | Alternative component | Position |
| | | Evaluation result | Evaluation result | Evaluation result | | Evaluation result | Evaluation result | Evaluation result | Evaluation result | Evaluation result |
| PR1 | Recover PC | 1 | 1 | 1 | | 1 | 1 | 1 | 1 | 1 | 1 |
| PR2 | Repair broken PC | 1 | 1 | 1 | | 0 | 1 | 1 | 1 | 1 | 0 |
| MR1 | Remove virus from PC | 1 | 1 | 1 | | 0 | 1 | 1 | 1 | 1 | 0 |
| MR2 | Recover broken thing (resource) | 1 | 1 | 1 | | 0 | 1 | 1 | 1 | 1 | 0 |
| MR3 | Stop process using resource | 1 | 1 | 1 | | 1 | 1 | 1 | 1 | 1 | 1 |
| DR1 | Invalidate data in PC of third person | 1 | 1 | 1 | | 1 | 1 | 1 | 1 | 1 | 1 |
| DR2 | Invalidate compromised data | 1 | 1 | 1 | | 1 | 1 | 1 | 1 | 1 | 1 |
| DR3 | Recover broken data | 1 | 1 | 1 | | 0 | 1 | 1 | 1 | 1 | 0 |
| DR4 | Track lost data | 1 | 1 | 1 | | 1 | 1 | 1 | 1 | 1 | 1 |
| DR5 | Recover lost data | 1 | 1 | 1 | | 0 | 1 | 1 | 1 | 1 | 0 |
| DR6 | Invalidate lost data | 1 | 1 | 1 | | 1 | 1 | 1 | 1 | 1 | 1 |
| DR7 | (Track lost external storage medium) | 1 | 1 | 1 | | 1 | 1 | 1 | 1 | 1 | 1 |

Calculation table including evaluation points for each sufficient condition and countermeasure information

| | Evaluation point for each sufficient condition and countermeasure information | | |
|---|---|---|---|
| | Countermeasure policy | Recovery countermeasure 1 | Cause investigation 1 |
| PR1 | Recover PC | 1 | 1 |
| PR2 | Repair broken PC | 0 | 1 |
| MR1 | Remove virus from PC | 0 | 0 |
| MR2 | Recover broken thing (resource) | 0 | 0 |
| MR3 | Stop process using resource | 1 | 1 |
| DR1 | Invalidate data in PC of third person | 1 | 1 |
| DR2 | Invalidate compromised data | 1 | 1 |
| DR3 | Recover broken data | 0 | 0 |
| DR4 | Track lost data | 1 | 1 |
| DR5 | Recover lost data | 0 | 0 |
| DR6 | Invalidate lost data | 1 | 1 |
| DR7 | (Track lost external storage medium) | 1 | 1 |
| PC1 | Position information (lending record) | 0 | 0 |
| PC2 | (Discard record) | 0 | 0 |
| PC3 | Distance/time with respect to owner | 1 | 1 |
| PC4 | Line of vision of owner | 1 | 1 |
| PC5 | Position information/distance from owner and the like | 1 | 1 |
| ... | ... | ... | ... |

FIG. 39

SECURITY COUNTERMEASURE FUNCTION EVALUATION PROGRAM

CROSS REFERENCE TO RELATED APPLICATIONS

This is a Continuation Application of PCT Application No. PCT/JP2009/071344, filed Dec. 22, 2009, which was published under PCT Article 21(2) in Japanese, and which is based upon and claims the benefit of priority from prior Japanese Patent Application No. 2008-328751, filed Dec. 24, 2008, the entire contents of both of which are incorporated herein by reference.

BACKGROUND OF THE INVENTION

1. Field of the Invention

The present invention relates to a security countermeasure function evaluation program for evaluating a security countermeasure function, and for example, the present invention relates to a security countermeasure function evaluation program capable of evaluating an effect of a security countermeasure function without relying on the level of skill of an estimator.

2. Description of the Related Art

There are various kinds of information processing apparatuses using OS (Operating Systems) for various purposes, and a larger amount of information is stored and more and more functions are provided.

Various kinds of security countermeasure functions are developed and can be implemented to the above information processing apparatuses. The developed and implemented security countermeasure functions range from a simple security countermeasure function for a single issue to a security countermeasure function for coping with a wide range of multiple threats. There are differences in functions provided by developers and vendors and in description about effects of these security countermeasure functions, and these differences make it difficult to objectively evaluate the effects and compare them with each other.

Therefore, the security countermeasure functions are evaluated from the perspective of whether the functions can support items that roughly identify the features of threats and security problems. In these evaluations, when the same kind of security countermeasure functions can respectively support an item, they are considered to achieve the same effect.

It should be noted that citation list information related to the invention of this application includes as follows.

CITATION LIST

Patent Literature

Patent Literature 1: Jpn. Pat. Appln. KOKAI Publication No. 2005-25523

BRIEF SUMMARY OF THE INVENTION

Presently, however, it is difficult to objectively evaluate and compare the effects of the security countermeasure functions as described above. For example, it is difficult to evaluate whether an implemented security countermeasure function has an effect of reducing a threat actually expected by a user, and it is difficult to evaluate whether a certain security countermeasure function has a higher effect than another security countermeasure function of a similar kind. Therefore, the actual effects and the comparisons of these effects are objectively evaluated according to the level of skill of an estimator.

This is because there exists neither any method nor reference for evaluating the effects of the security countermeasure functions without relying on the level of skill of an estimator.

An object of the present invention is to provide a security countermeasure function evaluation program capable of evaluating an effect of a security countermeasure function without relying on the level of skill of an estimator.

One aspect of the present invention is a security countermeasure function evaluation program stored in a computer readable storage medium, wherein the security countermeasure function evaluation program is used on and for a security countermeasure function evaluation apparatus for evaluating a security countermeasure function implemented on an information processing apparatus capable of reading and writing a database unit serving as a storage device, the security countermeasure function evaluation program comprising: a first program code for causing the security countermeasure function evaluation apparatus to execute writing processing for writing, to the database unit, security protection target asset information individually representing a physical body of the information processing apparatus, a function of the information processing apparatus, and data stored in the information processing apparatus and a plurality of pieces of security state information including security condition ID and state information which are individually related to each piece of the security protection target asset information; a second program code for causing the security countermeasure function evaluation apparatus to execute writing processing for writing, to the database unit, document data including threat information including information about an executioner of a threat and an execution condition, which are a cause of transition of a security condition from a safe state to a dangerous state or a damage occurrence state; a third program code for causing the security countermeasure function evaluation apparatus to execute writing processing for writing, to the database unit, a sufficient condition evaluation parameter including an option and a point for each of items including presence/non-presence of a function, a time, an effect, a notification range, an operation timing, and a degree of dependence on booting regarding a sufficient condition for executing any countermeasure policy and a countermeasure function evaluation parameter including an option and a point for each of items including presence/non-presence of a function, a time, an effect, a notification range, an operation timing, and a degree of dependence on booting regarding any security countermeasure function; a fourth program code for causing the security countermeasure function evaluation apparatus to execute writing processing for writing, to the database unit, sufficient condition table model-form information including a countermeasure policy region including countermeasure policy information for reducing an execution condition described in the information about the executioner of the threat and the execution condition, a selection region enumerating options for each of items including presence/non-presence of a function, a time, an effect, a notification range, and the degree of dependence on booting in association with the sufficient condition evaluation parameter regarding execution of countermeasure policy information and a function name for execution, and a point region in which a point according to an option selected by the selection region is written on the basis of the sufficient condition evaluation parameter; a fifth program code for causing the security countermeasure function evaluation apparatus to execute writing processing for writing, to the database unit, countermeasure model-form information including a countermeasure name region receiving a countermeasure name for identifying a product of a security countermeasure function, a selection region enumerating options for each of items including presence/non-presence of a function, a time, an effect, a notification range, and a degree of dependence on booting in association with the countermeasure function evaluation parameter, regarding a function name for execution and execution for a security countermeasure function of the product identified by the countermeasure name, and a point region in which a point according to an option selected by the selection region, is written on the basis of the countermeasure function evaluation parameter; a sixth program code for causing the security countermeasure function evaluation apparatus to execute processing for selecting security protection target asset information in the database unit based on a selection command when receiving input of the selection command of a security protection target asset including a specification of the security protection target asset; a seventh program code for causing the security countermeasure function evaluation apparatus to perform processing for displaying the selected security protection target asset information; an eighth program code for causing the security countermeasure function evaluation apparatus to execute processing for extracting from the database unit security state information related to the displayed security protection target asset information based on a security condition ID when receiving input of the security condition ID while the security protection target asset information is displayed; a ninth program code for causing the security countermeasure function evaluation apparatus to execute processing for displaying the extracted security condition ID of the security state information; a tenth program code for causing the security countermeasure function evaluation apparatus to execute processing for classifying each security condition ID into one of a safe, danger, or damage occurrence group based on a specification when receiving input of the specification about one of the safe, danger, or damage occurrence group for each displayed security condition ID; an eleventh program code for causing the security countermeasure function evaluation apparatus to execute processing for displaying outer frame information in a format according to the classified group by adding it to the displayed security condition ID; a twelfth program code for causing the security countermeasure function evaluation apparatus to execute processing for using a form of an arrow extending from the outer frame information according to the safe group to the outer frame information according to the danger or damage occurrence group based on a specification to draw first transition path information between the outer frame information when receiving input of a specification of displayed outer frame information; a thirteenth program code for causing the security countermeasure function evaluation apparatus to execute processing for using a form of an arrow extending from the outer frame information according to the dangerous group to the outer frame information according to the damage occurrence group based on a specification to draw second transition path information between the outer frame information when receiving input of a specification of displayed outer frame information; a fourteenth program code for causing the security countermeasure function evaluation apparatus to execute processing for associating the first or second transition path information with the threat information on the basis of a specification when receiving input of a specification of the displayed first or second transition path information and the threat information; a fifteenth program code for causing the security countermeasure function evaluation apparatus to execute processing for deleting first or second transition path information that is not associated with the threat information, and generating threat occurrence model information including a plurality of pieces of security state information, outer frame information, the first transition path information, the second transition path information, and threat information, which are associated with each other; a sixteenth program code for causing the security countermeasure function evaluation apparatus to execute processing for generating threat analysis intermediate data by associating transition source security state information, transition destination security state information, and threat information with each other based on the threat occurrence model information and displaying the threat analysis intermediate data; a seventeenth program code for causing the security countermeasure function evaluation apparatus to execute processing for extracting information about an executioner of a threat and an execution condition from the threat information based on a specification when receiving input of the specification of the executioner of the threat and the execution condition in the threat information in the threat analysis intermediate data while the threat analysis intermediate data are displayed; an eighteenth program code for causing the security countermeasure function evaluation apparatus to execute processing for generating threat analysis result data in which the transition source security state information, the transition destination security state information, and the extracted information about the executioner of the threat and the execution condition are associated with each other in the threat analysis intermediate data; a nineteenth program code for causing the security countermeasure function evaluation apparatus to execute writing processing for writing countermeasure policy information to a countermeasure policy region of the sufficient condition table model-form information when receiving input of the countermeasure policy information for reducing an execution condition described in the information about the executioner of the threat and the execution condition in the threat analysis result data; a twentieth program code for causing the security countermeasure function evaluation apparatus to execute processing for selecting a specified option in a selection region when any one of the options in the selection region is specified regarding execution of countermeasure policy information written to the countermeasure policy region and a function name for execution; a twenty-first program code for causing the security countermeasure function evaluation apparatus to execute processing for describing, in the point region, a point corresponding to an option selected in a selection region, based on the sufficient condition evaluation parameter; a twenty-second program code for causing the security countermeasure function evaluation apparatus to execute writing processing for writing, to the database unit, sufficient condition table information including a countermeasure policy region into which countermeasure policy information is input, a selection region in which an option is selected, and a point region describing a point; a twenty-third program code for causing the security countermeasure function evaluation apparatus to execute writing processing for writing the countermeasure name to the countermeasure name region in the countermeasure model-form information when receiving input of the countermeasure name; a twenty-fourth program code for causing the security countermeasure function evaluation apparatus to execute processing for selecting a specified option in a selection region when any one of the options in the selection region of the countermeasure model-form information is specified regarding execution of a countermeasure name written to the countermeasure name region and a function name for execution; a twenty-fifth program code for causing the security countermeasure function evaluation apparatus to execute processing for describing, in a point region of the countermeasure model-form information, a point corresponding to an option selected in the selection region of the countermeasure model-form information, based on the countermeasure function evaluation parameter; a twenty-sixth program code for causing the security countermeasure function evaluation apparatus to execute writing processing for writing, to the database unit, countermeasure information including a countermeasure name region into which a countermeasure name is input, a selection region in which an option is selected, a point region describing a point, which are generated on the basis of the countermeasure model-form information; a twenty-seventh program code for causing the security countermeasure function evaluation apparatus to execute processing for calculating a difference obtained by subtracting a point in a point region of sufficient condition table information from a point in a point region of countermeasure information regarding the point region of the same item in the sufficient condition table information and the countermeasure information; a twenty-eighth program code for causing the security countermeasure function evaluation apparatus to execute processing for performing evaluation result point writing processing for writing a point of an evaluation result for each of the same items in the sufficient condition table information and the countermeasure information, wherein when the difference is equal to or more than 0, the evaluation result is adopted as a point of a positive value, and when the difference is less than 0, the evaluation result is adopted as a point of a value zero; a twenty-ninth program code for causing the security countermeasure function evaluation apparatus to execute processing for calculating a mean value of points in the evaluation results for respective functions of each piece of countermeasure policy information; a thirtieth program code for causing the security countermeasure function evaluation apparatus to execute processing for calculating an evaluation point by obtaining a summation of all the mean values for each piece of countermeasure policy information; a thirty-first program code for causing the security countermeasure function evaluation apparatus to execute processing for calculating a transition probability prior to countermeasure, wherein before a security countermeasure function is implemented on the information processing apparatus, based on the threat analysis result data, a number of the same pieces of transition source security state information is adopted as a denominator value, and a number of the same pieces of transition destination security state information having a common transition source is adopted as a numerator value, and the numerator value is divided by the denominator value, whereby the transition probability prior to countermeasure is calculated; a thirty-second program code for causing the security countermeasure function evaluation apparatus to execute processing for calculating a transition probability after countermeasure, wherein after a security countermeasure function is implemented on the information processing apparatus, the evaluation point is subtracted from the value of the numerator used for calculating the transition probability prior to countermeasure, and the value of the numerator is thus corrected, and the value of this corrected numerator is divided by the value of the denominator, whereby the transition probability after countermeasure is calculated; and a thirty-third program code for causing the security countermeasure function evaluation apparatus to execute processing for displaying the transition probability prior to countermeasure and the transition probability after countermeasure.

According to the one aspect of the invention, an evaluation is made as to whether each item of the countermeasure information representing the security countermeasure function in detail satisfies each item of the sufficient condition table information, and the evaluation points are calculated from the evaluation results of the respective items, whereby the transition probabilities are calculated based on the evaluation points. In this configuration, even an inexperienced estimator can evaluate each item of the security countermeasure function of the evaluation target in detail, and therefore, the effect of the security countermeasure function can be evaluated without relying on the level of skill of an estimator.

As described above, according to the present invention, an effect of a security countermeasure function can be evaluated without relying on the level of skill of an estimator.

BRIEF DESCRIPTION OF THE SEVERAL VIEWS OF THE DRAWING

FIG. 1 is a schematic diagram illustrating a security countermeasure function evaluation apparatus and peripheral configuration thereof according to an embodiment of the present invention.

FIG. 2 is a schematic diagram illustrating an example of a security protection target asset information and a security state information according to the embodiment.

FIG. 3 is a schematic diagram illustrating an example of an evaluation parameter table including sufficient condition evaluation parameters and countermeasure function evaluation parameters according to the embodiment.

FIG. 4 is a schematic diagram illustrating an example of sufficient condition table model-form information according to the embodiment.

FIG. 5 is a schematic diagram illustrating an example of countermeasure model-form information according to the embodiment.

FIG. 6 is a schematic diagram illustrating an example of recovery sufficient condition model-form information according to the embodiment.

FIG. 7 is a schematic diagram illustrating an example of recovery sufficient condition model-form information according to the embodiment.

FIG. 8 is a schematic diagram illustrating an example of recovery countermeasure model-form information according to the embodiment.

FIG. 10 is a schematic diagram illustrating groups of security conditions according to the embodiment.

FIG. 13 is a schematic diagram illustrating an example of threat occurrence model information according to the embodiment.

FIG. 14 is a schematic diagram illustrating an example of threat analysis result data according to the embodiment.

FIG. 15 is a schematic diagram illustrating an example of threat analysis result data according to the embodiment.

FIG. 16 is a schematic diagram illustrating an example of sufficient condition table information according to the embodiment.

FIG. 17 is a schematic diagram illustrating an example of sufficient condition table information according to the embodiment.

FIG. 18 is a schematic diagram illustrating an example of sufficient condition table information according to the embodiment.

FIG. 19 is a flowchart illustrating evaluation processing of a security countermeasure function according to the embodiment.

FIG. 22 is a schematic diagram illustrating an example of a calculation table including evaluation points according to the embodiment.

FIG. 23 is a schematic diagram illustrating an example of transition parameters according to the embodiment.

FIG. 24 is a schematic diagram illustrating an example of a calculation table including transition probabilities prior to countermeasure according to the embodiment.

FIG. 25 is a schematic diagram illustrating an example of a calculation table of transition probabilities after countermeasure according to the embodiment.

FIG. 26 is a flowchart illustrating simulation processing according to the embodiment.

FIG. 27 is a schematic diagram illustrating an example of a simulation result prior to countermeasure according to the embodiment.

FIG. 28 is a schematic diagram illustrating an example of a simulation result after countermeasure according to the embodiment.

FIG. 30 is a flowchart illustrating generation processing of recovery model information according to the embodiment.

FIG. 34 is a schematic diagram illustrating an example of recovery sufficient condition table information according to the embodiment.

FIG. 35 is a schematic diagram illustrating an example of recovery sufficient condition table information according to the embodiment.

FIG. 36 is a schematic diagram illustrating an example of recovery countermeasure information according to the embodiment.

FIG. 37 is a schematic diagram illustrating an example of a calculation process of an evaluation result according to the embodiment.

FIG. 38 is a schematic diagram illustrating an example of a calculation table including evaluation points according to the embodiment.

FIG. 39 is a schematic diagram illustrating an example of evaluation points according to the embodiment.

DETAILED DESCRIPTION OF THE INVENTION

Figure 9:
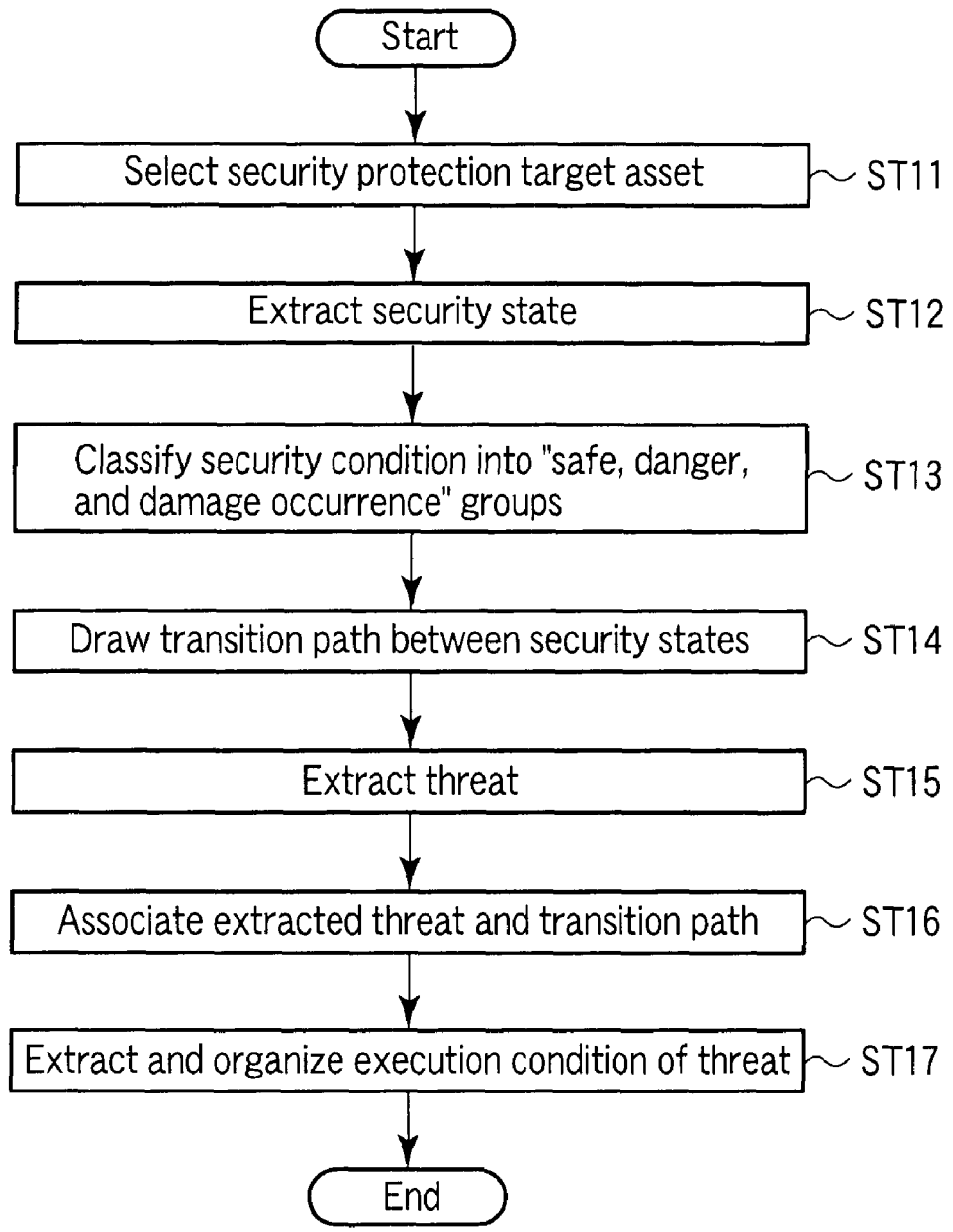
FIG. 9 is a flowchart illustrating generation processing of threat occurrence model information according to the embodiment.

An embodiment of the present invention will be hereinafter explained with reference to the drawings. It should be noted that the following security countermeasure function evaluation apparatus can be implemented as either a hardware configuration or a combination of hardware resources and software. As shown in FIG. 1, software having a combined configuration is installed to a computer serving as a security countermeasure function evaluation apparatus 10 from a network or a storage medium M in advance, and a security countermeasure function evaluation program is used to achieve each function of the security countermeasure function evaluation apparatus 10.

FIG. 1 is a schematic diagram illustrating a security countermeasure function evaluation apparatus and peripheral configuration thereof to which a security countermeasure function evaluation program according to an embodiment of the present invention is installed. This security countermeasure function evaluation apparatus 10 has a function of evaluating a security countermeasure function implemented in an information processing apparatus, and is connected to a database unit 20 serving as a readable/writable storage device. The security countermeasure function to be evaluated is a product that achieves a security countermeasure function. More specifically, examples of security countermeasure functions to be evaluated include software, hardware, a product made of a combination of software and hardware, a product using a network, and a product of any form of implementation. Accordingly, the term "security countermeasure function" may be read as "security countermeasure product".

The security countermeasure function evaluation apparatus 10 includes an input unit 11, an initial setting unit 12, a storage unit 13, a threat model generation unit 14, an evaluation point calculation unit 15, a transition probability calculation unit 16, a simulation execution unit 17, a recovery model generation unit 18, and a display unit 19.

In this case, the input unit 11 is an input device which is operated by an estimator to input information such as various kinds of data and commands into the security countermeasure function evaluation apparatus 10.

The initial setting unit 12 has a function of writing security protection target asset information and various kinds of model-form information to the database unit 20 during installation of a security countermeasure function evaluation program including security protection target asset information and various kinds of model-form information.

More specifically, the initial setting unit 12 has a function of writing, to the database unit 20, the security protection target asset information, multiple pieces of security state information, document data, sufficient condition evaluation parameters, countermeasure function evaluation parameters, sufficient condition table model-form information, countermeasure model-form information, recovery sufficient condition table model-form information, and recovery countermeasure model-form information, which are explained later.

The storage unit 13 is a readable/writable memory which can be read/written by the respective units 11, 12, 14 to 19. For example, the storage unit 13 stores, as necessary, data input by the input unit 11, information read/written to/from the database unit 20 by each unit 12, 14 to 18, data processed by each unit 14 to 18, data being calculated or data of a calculation result, and information displayed by the display unit 19.

For example, the threat model generation unit 14 includes the following functions (f14-1) to (f14-12).

(f14-1) is a function for selecting security protection target asset information in the database unit 20 on the basis of a selection command when receiving input of the selection command of a security protection target asset including a specification of the security protection target asset in response to operation with the input unit 11.

(f14-2) is a function for displaying the selected security protection target asset information on the display unit 19 and a function for extracting from the database unit 20 security state information related to the displayed security protection target asset information on the basis of a security condition ID when receiving input of the security condition ID while the security protection target asset information is displayed.

(f14-3) is a function for displaying the security condition ID of the extracted security state information on the display unit 19.

(f14-4) is a function for classifying each security condition ID into one of a safe, danger, or damage occurrence group on the basis of a specification when receiving input of the specification about one of a safe, danger, or damage occurrence group for each displayed security condition ID.

(f14-5) is a function for displaying outer frame information in a format according to the classified group on the display unit 19 by adding it to the displayed security condition ID.

(f14-6) is a function for drawing transition path information between outer frame information in a form of an arrow toward the outer frame information in accordance with the danger or damage occurrence group from the outer frame information in a form according to a safety group on the basis of a specification when receiving input of the specification of the displayed outer frame information.

(f14-7) is a function for drawing other transition path information between outer frame information in a form of an arrow toward the outer frame information in accordance with the damage occurrence group from the outer frame information according to a danger group on the basis of a specification when receiving input of the specification of the displayed outer frame information.

(f14-8) is a function for associating transition path information and threat information on the basis of a specification when receiving input of the specification of each transition path information and threat information displayed.

(f14-9) is a function for deleting transition path information that is not associated with the threat information, and generating threat occurrence model information including a plurality of pieces of security state information, outer frame information, first transition path information, second transition path information, and threat information, which are associated with each other.

(f14-10) is a function for generating threat analysis intermediate data by associating transition source security state information, transition destination security state information, and threat information with each other on the basis of threat occurrence model information and displaying the threat analysis intermediate data on the display unit 19.

(f14-11) is a function for extracting information about an executioner of a threat and an execution condition from the threat information on the basis of a specification when receiving input of the specification of the executioner of the threat and the execution condition in the threat information in the threat analysis intermediate data while the threat analysis intermediate data are displayed.

(f14-12) is a function for generating threat analysis result data in which the transition source security state information, the transition destination security state information, and the extracted information about the executioner of the threat and the execution condition are associated with each other in the threat analysis intermediate data.

For example, the evaluation point calculation unit 15 has the following functions (f15-1) to (f15-12).

(f15-1) is a function for writing countermeasure policy information to a countermeasure policy region of the sufficient condition table model-form information when receiving input of the countermeasure policy information for reducing an execution condition described in the information about the executioner of the threat and the execution condition in the threat analysis result data.

(f15-2) is a function for selecting a specified option in a selection region when any one of the options in the selection region is specified regarding execution of countermeasure policy information and a function name for execution written in the countermeasure policy region.

(f15-3) is a function for describing, in a point region, a point corresponding to an option selected in a selection region, on the basis of the sufficient condition evaluation parameter.

(f15-4) is a function for writing, to the database unit 20, sufficient condition table information including a countermeasure policy region into which countermeasure policy information is input, a selection region in which an option is selected, and a point region describing a point.

(f15-5) is a function for writing a countermeasure name to a countermeasure name region in countermeasure model-form information when receiving input of the countermeasure name.

(f15-6) is a function for selecting a specified option in a selection region when any one of the options in the selection region of the countermeasure model-form information is specified regarding execution of a countermeasure name written to the countermeasure name region and a function name for execution.

(f15-7) is a function for describing, in a point region of the countermeasure model-form information, a point corresponding to an option selected in a selection region of the countermeasure model-form information, on the basis of the countermeasure function evaluation parameter.

(f15-8) is a function for writing, to the database unit 20, countermeasure information including a countermeasure name region into which a countermeasure name is input, a selection region in which an option is selected, a point region describing a point, which are generated on the basis of the countermeasure model-form information.

(f15-9) is a function for calculating a difference obtained by subtracting a point in a point region of sufficient condition table information from a point in a point region of countermeasure information regarding the point region of the same item in the sufficient condition table information and the countermeasure information.

(f15-10) is an evaluation result point writing function for writing a point of an evaluation result for each of the same items in the sufficient condition table information and the countermeasure information, wherein when the difference is equal to or more than 0, the evaluation result is adopted as a point of a positive value, and when the difference is less than 0, the evaluation result is adopted as a point of a value zero. It should be noted that when the evaluation result point writing function adopts the evaluation result as a point of a positive value, a function may be provided to adopt a weighting value set for each item in advance as the point of the evaluation result.

(f15-11) is a function for calculating a mean value of points in the evaluation results for respective functions of each piece of countermeasure policy information.

(f15-12) is a function for calculating an evaluation point by obtaining a summation of all the mean values for each piece of countermeasure policy information.

When a plurality of security countermeasure functions are implemented on an information processing apparatus, the evaluation point calculation unit 15 may have a function (f15-13) for calculating an ultimate evaluation point by adding, for each piece of countermeasure policy information, the evaluation point calculated for each piece of countermeasure policy information regarding each security countermeasure function.

Further, the evaluation point calculation unit 15 may have, for example, the following functions (f15-14) to (f15-20).

(f15-14) is a function for writing the recovery sufficient condition information to the sufficient condition region of the recovery sufficient condition table model-form information when receiving input of the recovery sufficient condition information for each of items of the type of log, target of tracking function, and backup after the recovery model generation unit 18 generates the recovery model information.

(f15-15) is a function of writing, to the database unit 20, the recovery sufficient condition table information including the recovery countermeasure policy region and the sufficient condition region into which the recovery sufficient condition information is written.

(f15-16) is a function for writing the countermeasure name to the countermeasure name region in the recovery countermeasure model-form information when receiving input of the countermeasure name for the recovery countermeasure model-form information.

(f15-17) is a function for selecting specified recovery sufficient condition information when receiving the specification of the recovery sufficient condition information as an option in the recovery countermeasure model-form information.

(f15-18) is a function for writing, to the database unit 20, the recovery countermeasure information including the countermeasure name region generated based on the recovery countermeasure model-form information and into which the countermeasure name is input and the selection region in which the recovery sufficient condition information is selected.

(f15-19) is a recovery evaluation point writing function for writing a point of an evaluation result for each of the same items in recovery function requirement information in the recovery countermeasure policy region of the recovery sufficient condition table information, wherein when the recovery sufficient condition information in the recovery sufficient condition table information in each of the same items in the recovery sufficient condition table information and in the recovery countermeasure information matches recovery sufficient condition information in the recovery countermeasure information, the evaluation result is adopted as a point of a positive value, and when both do not match each other, the evaluation result is adopted as a point of a value zero. It should be noted that when the recovery evaluation point writing function adopts the evaluation result as a point of a positive value, a function may be provided to adopt a weighting value set for each item in advance as the point of the evaluation result.

(f15-20) is a function for calculating an evaluation point by obtaining a summation of points of all the evaluation results for each recovery function requirement.

The transition probability calculation unit 16 has the following functions (f16-1) to (f16-3).

(f16-1) is a function for calculating a transition probability prior to countermeasure as follows. Before a security countermeasure function is implemented on the information processing apparatus, on the basis of the threat analysis result data, the number of the same pieces of transition source security state information is adopted as a denominator value, and the number of the same pieces of transition destination security state information having the common transition source is adopted as a numerator value. Then, the numerator value is divided by the denominator value, whereby the transition probability prior to countermeasure is calculated.

(f16-2) is a function for calculating a transition probability after countermeasure as follows. After a security countermeasure function is implemented on the information processing apparatus, the evaluation point is subtracted from the value of the numerator used for calculating the transition probability prior to countermeasure, and accordingly, the value of the numerator is corrected. Then, the value of this corrected numerator is divided by the value of the denominator, whereby the transition probability after countermeasure is calculated.

(f16-3) is function for displaying the transition probability prior to countermeasure and the transition probability after countermeasure on the display unit 19.

Further, the transition probability calculation unit 16 may include the following functions (f16-4) to (f16-6).

(f16-4) is a function for calculating a transition probability prior to countermeasure as follows. Before a security countermeasure function is implemented on the information processing apparatus, on the basis of the recovery model information, the number of pieces of recovery function requirement information related to the same transition source security state information is adopted as a denominator value, and the number of pieces of recovery function requirement information related to the same transition destination security state information having the common transition source is adopted as a numerator value. Then, the numerator value is divided by the denominator value, whereby the transition probability prior to countermeasure is calculated.

(f16-5) is a function for calculating a transition probability after countermeasure as follows. After a security countermeasure function is implemented on the information processing apparatus, the value of the numerator used for calculating the transition probability prior to countermeasure is multiplied by the evaluation point of the recovery evaluation point writing function, and accordingly, the value of the numerator is corrected. Then, the value of this corrected numerator is divided by the value of the denominator serving as the number of pieces of recovery function requirement information, whereby the transition probability after countermeasure is calculated.

(f16-6) is function for displaying the transition probability prior to countermeasure and the transition probability after countermeasure on the display unit 19, on the basis of the recovery model information and the evaluation point.

The simulation execution unit 17 has a function for executing simulation based on the transition probability calculated by the transition probability calculation unit 16 and a function for displaying a simulation execution result on the display unit 19.

The recovery model generation unit 18 has the following functions (f18-1) to (f18-5).

(f18-1) is a function for extracting security state information as follows. When an estimator operates the input unit 11, and input of a selection command of a security protection target asset including a specification of the security protection target asset is received, security protection target asset information is selected from the database unit 20 on the basis of the selection command and is displayed. When input of a security condition ID is received while the security protection target asset information is displayed, the security state information related to the displayed security protection target asset information is extracted from the threat occurrence model information on the basis of the security condition ID.

(f18-2) is a function for displaying the security condition ID of the security state information extracted from the threat occurrence model information, and when input of a specification of one of safe, danger, and damage occurrence groups is received for each security condition ID, the security condition ID is classified into one of safe, danger, and damage occurrence groups on the basis of this specification. Then, outer frame information in a format according to each group is displayed on the display unit 19 by adding it to the displayed security condition ID.

(f18-3) is a function for drawing transition path information between outer frame information in a form of an arrow toward the outer frame information in accordance with each safety group from the outer frame information in a form according to the danger or damage occurrence group on the basis of a specification when receiving input of the specification of the displayed outer frame information.

(f18-4) is a function for associating transition path information and recovery function requirement information when receiving input of recovery function requirement information for each piece of transition path information.

(f18-5) is a function for generating recovery model information including a plurality of pieces of security state information, outer frame information, transition path information, and recovery function requirement information, which are associated with each other.

The display unit 19 is controlled by the respective units 11,12,14 to 18, and is a display device for displaying data stored in the storage unit 13 by the processing performed by each unit 12,14 to 18 and data received from each unit 12,14 to 18.

The database unit 20 includes a protection target asset DB 21, a threat occurrence model DB 22, a threat evaluation index DB 23, a security countermeasure function evaluation index DB 24, and a recovery model DB 25.

In this case, the protection target asset DB 21 is a nonvolatile storage unit that can be read/written by the respective units 11,12,14 to 19. For example, the protection target asset DB 21 stores, as necessary, security protection target asset information, security state information, and the like, explained later.

The threat occurrence model DB 22 is a nonvolatile storage unit that can be read/written by the respective units 11,12,14 to 19. For example, the threat occurrence model DB 22 stores, as necessary, threat occurrence model information and the like, explained later.

The threat evaluation index DB 23 is a nonvolatile storage unit that can be read/written by the respective units 11,12,14 to 19. For example, the threat evaluation index DB 23 stores, as necessary, document data, threat analysis result data, and the like, explained later.

The security countermeasure function evaluation index DB 24 is a nonvolatile storage unit that can be read/written by the respective units 11,12,14 to 19. For example, the security countermeasure function evaluation index DB 24 stores, as necessary, a sufficient condition evaluation parameter, a countermeasure function evaluation parameter, sufficient condition table model-form information, countermeasure model-form information, recovery sufficient condition table model-form information, recovery countermeasure model-form information, and the like, explained later.

The recovery model DB 25 is a nonvolatile storage unit that can be read/written by the respective units 11,12,14 to 19. For example, the recovery model DB 25 stores, as necessary, recovery model information and the like, explained later.

The DBs 21 to 25 may be a single DB including all the DBs 21 to 25. Alternatively, the DBs 21 to 25 may be a plurality of DBs including any combination of the DBs 21 to 25. The database unit 20 is not limited to a storage device provided outside of the security countermeasure function evaluation apparatus 10. Alternatively, the database unit 20 may be achieved as a storage device provided within the security countermeasure function evaluation apparatus 10.

Subsequently, operation of the security countermeasure function evaluation apparatus having the above configuration will be explained with reference to FIGS. 2 to 40.

(Initial Setting)

The initial setting unit 12 writes security protection target asset information and various kinds of model-form information to the database unit 20. This writing operation is executed once during installation of a security countermeasure function evaluation program including security protection target asset information, various kinds of model-form information, evaluation parameters, and the like. It should be noted that various kinds of model-form information means various kinds of information in blank, and therefore, the various kinds of model-form information may be read as the information in blank. For example, "sufficient condition table model-form information" may be read as "blank sufficient condition table information".

Subsequently, a writing operation will be explained more specifically.

As shown in FIG. 2, the initial setting unit 12 writes, to the protection target asset DB 21 of the database unit 20, security protection target asset information respectively indicating physical bodies of information processing apparatuses, functions of information processing apparatuses, and data saved in information processing apparatuses and a plurality of pieces of security state information including security condition IDs and state information respectively associated with the security protection target asset information.

Further to that, the security protection target asset is classified into one of the physical body of the information processing apparatus, the function of the information processing apparatus, and the data stored in the information processing apparatus. The physical body of the information processing apparatus, the function of the information processing apparatus, and the data stored in the information processing apparatus are independent of each other and do not have any inclusion relationship.

The information processing apparatus is an apparatus for performing information processing on electronic data (for example, storage processing, process, and/or arithmetic processing). For example, the information processing apparatus corresponds to any information processing apparatus such as a personal computer, a mobile personal computer, a portable telephone, a server, a household appliance (hereinafter referred to as "household product"), a game machine, a smart card, a smart card issuing apparatus, an IC chip, an information transmission apparatus, and a network apparatus.

As shown in FIG. 2, the physical body of the information processing apparatus has hardware resources such as a CPU, a storage device, and an input/output device, and means something physically existing.

As shown in FIG. 2, the function of the information processing apparatus includes firmware such as an OS and BIOS, command libraries, various applications, and the like, and setting information needed for executing them, and means software including processing procedures and/or commands that can be executed by hardware of the information processing apparatus.

As shown in FIG. 2, the data stored in the information processing apparatus mean data such as personal information, music data, business related information, and transmitted/received mail.

Further, the initial setting unit 12 writes, to the threat evaluation index DB 23 of the database unit 20, document data including threat information including information about an executioner of a threat and an execution condition that may cause a security condition to change from the safe state to the dangerous state or damage occurrence state.

Further, as shown in FIG. 3, the initial setting unit 12 writes, to the security countermeasure function evaluation index DB 24 of the database unit 20, a sufficient condition evaluation parameter including an option and a point for each of items including presence/non-presence of a function, a time, an effect, a notification range, an operation timing, and a degree of dependence on booting regarding a sufficient condition for executing any countermeasure policy and a countermeasure function evaluation parameter including an option and a point for each of items including presence/non-presence of a function, a time, an effect, a notification range, an operation timing, and a degree of dependence on booting regarding any security countermeasure function. In FIG. 3, the sufficient condition evaluation parameter and the countermeasure function evaluation parameter are respectively included in the evaluation parameter table. However, they are not limited thereto. The sufficient condition evaluation parameter and the countermeasure function evaluation parameter may be separately provided. For example, "time" referred to herein means a time needed to start the information processing apparatus.

As shown in FIG. 4, the initial setting unit 12 writes, to the security countermeasure function evaluation index DB 24 of the database unit 20, sufficient condition table model-form information including a countermeasure policy region including countermeasure policy information for reducing an execution condition described in the information about the executioner of the threat and the execution condition, a selection region enumerating options for each of items including presence/non-presence of a function, a time, an effect, a notification range, and the degree of dependence on booting in association with the sufficient condition evaluation parameter regarding execution of countermeasure policy information and a function name for execution, and a point region in which a point according to an option selected by the selection region is written on the basis of the sufficient condition evaluation parameter.

Further, as shown in FIG. 5, the initial setting unit 12 writes, to the security countermeasure function evaluation index DB 24 of the database unit 20, countermeasure model-form information including a countermeasure name region receiving a countermeasure name for identifying a product of a security countermeasure function, a selection region enumerating options for each of items including presence/non-presence of a function, a time, an effect, a notification range, and the degree of dependence on booting in association with the countermeasure function evaluation parameter, and a point region in which a point according to an option selected by the selection region, is written on the basis of the countermeasure function evaluation parameter, regarding a function name for execution and execution for a security countermeasure function of the product identified by the countermeasure name.

Further, as shown in FIGS. 6 and 7, the initial setting unit 12 writes, to the security countermeasure function evaluation index DB 24 of the database unit 20, a recovery countermeasure policy region including recovery function requirement information indicating recovery countermeasure policies and recovery sufficient condition table model-form information receiving sufficient condition regions receiving recovery sufficient condition information of each of items of the type of log, target of tracking function, and backup, regarding the sufficient condition for achieving the recovery function requirement information in the recovery countermeasure policy region. It should be noted that the type of log includes a target, a position, a user, a time, and a storage location.

Further, as shown in FIG. 8, the initial setting unit 12 writes, to the security countermeasure function evaluation index DB 24 of the database unit 20, a countermeasure name region receiving a countermeasure name for identifying a product of a security countermeasure function and recovery countermeasure model-form information including a selection region representing, as an option, recovery sufficient condition information for each of items of the type of log, target of tracking function, and backup, regarding the security countermeasure function of the product identified based on the countermeasure name. It should be noted that the recovery sufficient condition information serving as options includes recovery sufficient condition information that is input to the recovery sufficient condition table model-form information described above. As described above, the type of log includes a target, a position, a user, a time, and a storage location.

(Generation Processing of Threat Occurrence Model Information: FIG. 9)

In the security countermeasure function evaluation apparatus 10, when the input unit 11 receives a selection command of a security protection target asset including a specification of a security protection target asset in response to an operation performed with the input unit 11 by an estimator, the threat model generation unit 14 selects security protection target asset information from the protection target asset DB 21 of the database unit 20 on the basis of the selection command (ST11), and transmits the security protection target asset information to the display unit 19.

The display unit 19 displays the security protection target asset information. There are three kinds of security protection target asset, i.e., the physical body of the information processing apparatus, the function of the information processing apparatus, and the data stored in the information processing apparatus.

When the input unit 11 receives a security condition ID in response to an operation performed by an estimator while the security protection target asset information is displayed, the threat model generation unit 14 extracts, on the basis of the security condition ID, security state information related to the displayed security protection target asset information from the protection target asset DB 21 of the database unit 20 (ST12).

Adequateness and independence of each security condition are confirmed under a condition where there is a threat having a unique feature for changing from a transition source state to a transition destination state.

The threat model generation unit 14 transmits the extracted security condition ID of the security state information to the display unit 19. The display unit 19 displays the security condition ID.

When the input unit 11 receives a specification of safe, danger, and damage occurrence groups in response to an operation performed by an estimator for each security condition ID displayed, the threat model generation unit 14 classifies, on the basis of the specification, each security condition into any one of safe, danger, and damage occurrence groups (ST13). The respective groups are independent from each other and do not have any inclusion relationship.

In this case, as shown in FIG. 10, the "safety" group is a group including at least one of a state where the apparatus is under control of a legitimate administrator, a state where the apparatus is discarded under a legitimate administrator, a state where a function is executed normally within a range intended by a legitimate administrator, and a state where protection target data are present within the information processing apparatus.

The "danger" group is a group including at least one of a state where the apparatus is not under control of a legitimate administrator, a state where a function may be executed beyond a range intended by a legitimate administrator (for example, a state where the apparatus is infected with a computer virus), a state where protection target data are viewed by a person other than the legitimate administrator, a state where protection target data are present on a communication path, a state where protection target data are present in an apparatus other than the information processing apparatus, a state where protection target data are stored in an external storage medium, and a state where protection target data are printed.

The "damage occurrence" group is a group including at least one of a state where a security protection target asset is either broken (a state where a function cannot be executed), stolen, lost, or infected with a computer virus, a state where processing is executed beyond a range intended by a legitimate administrator, and a state where another information processing apparatus and other people's assets therein are damaged regardless of an intention of a legitimate administrator.

In any case, the threat model generation unit 14 displays outer frame information in a format according to the classified group on the display unit 19 by adding it to the displayed security condition ID. Examples of formats according to the classified groups may be desired formats such as a solid line (safety), an alternate long and short dash line (danger), and a broken line (damage occurrence).

Subsequently, when the threat model generation unit 14 receives input of a specification of displayed outer frame information in response to an operation performed with the input unit 11 by an estimator, the threat model generation unit 14 uses a form of an arrow extending from the outer frame information in the format according to the safety group to the outer frame information according to the danger or damage occurrence group on the basis of this specification, thereby drawing transition path information (first transition path information) between the two pieces of outer frame information (drawing an arrow).

Likewise, when the threat model generation unit 14 receives input of a specification of displayed outer frame information, the threat model generation unit 14 uses a form of an arrow extending from the outer frame information according to the danger group to the outer frame information according to the damage occurrence group on the basis of this specification, thereby drawing transition path information (second transition path information) between the two pieces of outer frame information (drawing an arrow) (ST14).

The transition path information drawn in step ST14 comprises arrows in only three kinds of directions, i.e., a direction from "safety" to "danger", a direction from "danger" to "damage occurrence", and a direction from "safety" to "damage occurrence". Although there are only three kinds of directions of transition path information, the type of arrow line may be any type (for example, a solid line, a broken line, an alternate long and short dash line, and a thick line).

In response to an operation performed with the input unit 11 by an estimator, the threat model generation unit 14 extracts threat information representing a possible threat from document data in the threat evaluation index DB 23 (ST15). In this case, the threat means a force for urging transition between security conditions in a direction away from the safe state. In other words, the threat means a cause of transition between security conditions in a direction away from the safe state. The threat information is text data describing a threat, and includes an executioner of a threat and an execution condition in an unorganized state. The document data are electronic data including documents about empirical rules and actually occurred security problems and attack examples.

When the threat model generation unit 14 receives an input of a specification of either displayed transition path information or displayed threat information in response to operation performed with the input unit 11 by an estimator, the threat model generation unit 14 associates the transition path information with the threat information on the basis of this specification (ST16). Thereafter, the threat model generation unit 14 deletes the transition path information not associated with any threat information.

Figure 11:
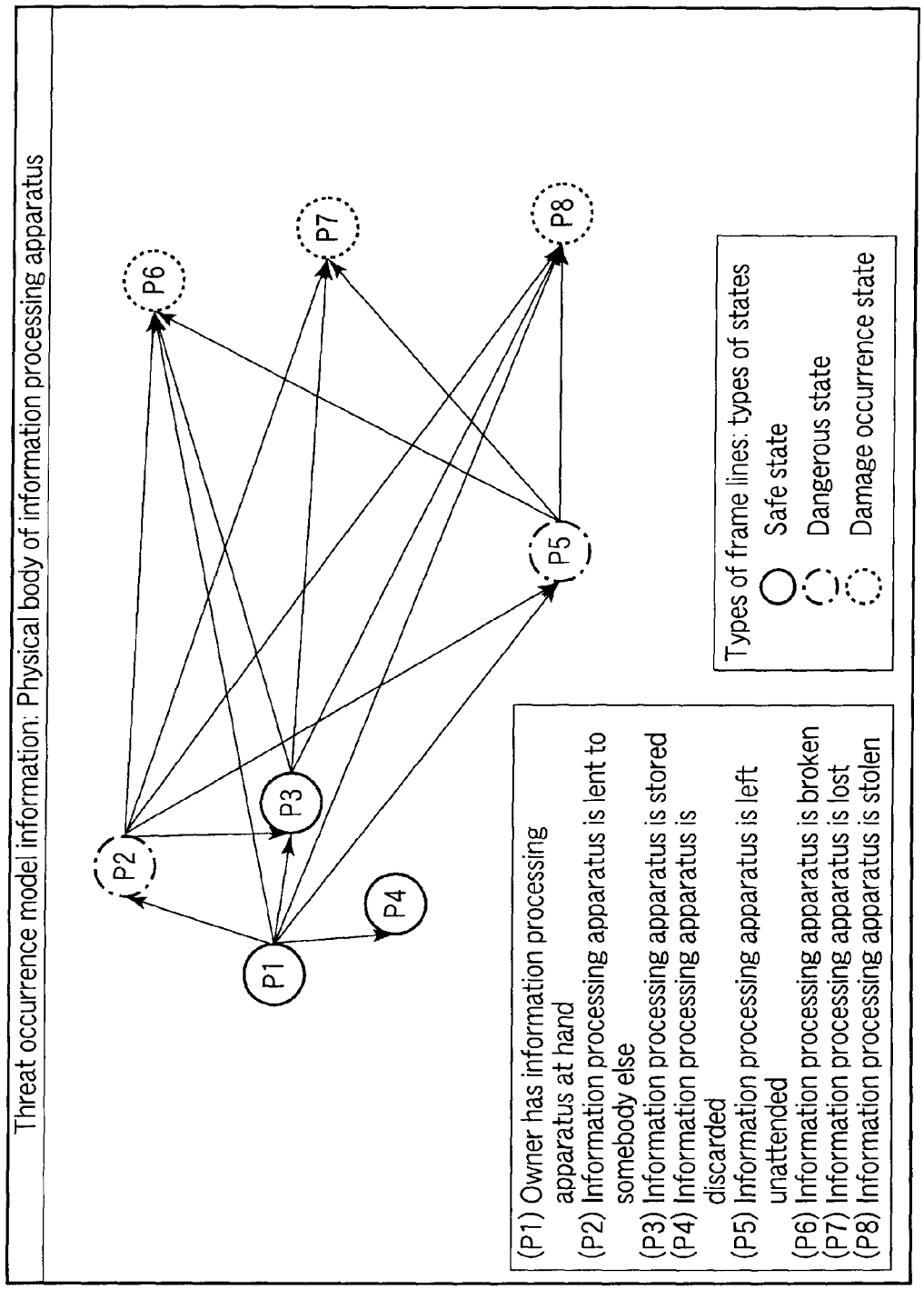
FIG. 11 is a schematic diagram illustrating an example of threat occurrence model information according to the embodiment.
Figure 12:
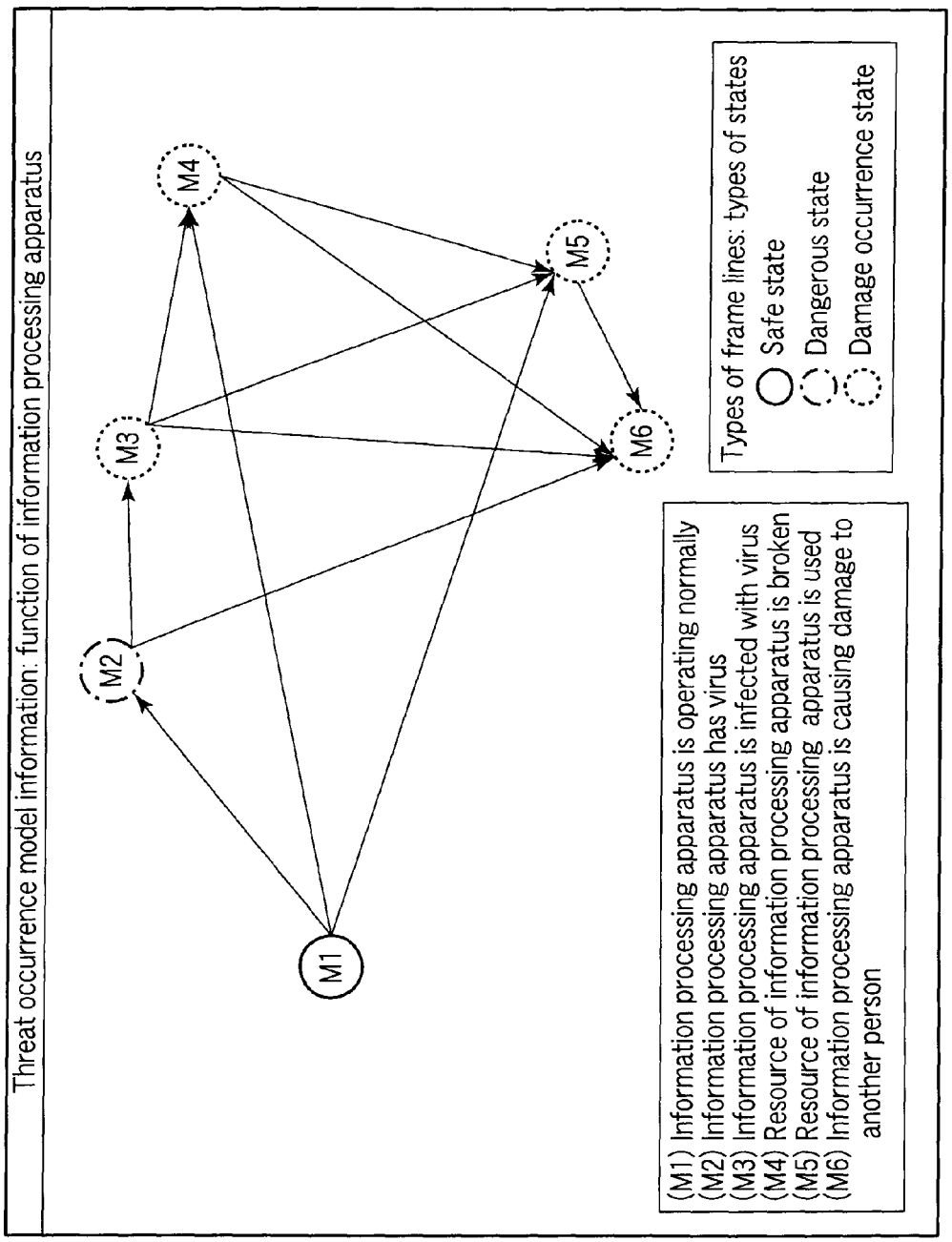
FIG. 12 is a schematic diagram illustrating an example of threat occurrence model information according to the embodiment.

Therefore, as shown in FIG. 11, 12, or 13, the threat model generation unit 14 generates threat occurrence model information including a plurality of pieces of security state information, outer frame information, transition path information, and threat information, which are associated with each other. The threat occurrence model information is displayed by the display unit 19.

Further, the threat model generation unit 14 generates threat analysis intermediate data by associating transition source security state information, transition destination security state information, and threat information with each other on the basis of threat occurrence model information and the security state information extracted in step ST12, and displays the threat analysis intermediate data on the display unit 19. However, at this stage, the threat information is in an unorganized state.

When the threat model generation unit 14 receives an input of a specification of either the executioner of the threat or the execution condition in the threat information of the threat analysis intermediate data in response to an operation performed with the input unit 11 by an estimator while the threat analysis intermediate data are displayed, the threat model generation unit 14 extracts and organizes information about the executioner of the threat (information about "Who") and the execution condition under which the threat exerts effect (information about "How") from the threat information on the basis of this specification as shown in FIGS. 14 and 15 (ST17).

Therefore, the threat model generation unit 14 generates threat analysis result data in which the transition source security state information, the transition destination security state information, and the extracted information about the executioner of the threat and the execution condition are associated with each other in the threat analysis intermediate data.

On the other hand, in a case of a function of an information processing apparatus, the threat model generation unit 14 generates the threat analysis result data from the threat analysis intermediate data by organizing not only the information about the executioner of the threat and the execution condition but also a network condition. The network condition represents either a case where transmission and reception via network is enabled (ON) or a case where it has nothing to do with presence/non-presence of a network (any). In this case, "presence/non-presence of network" means "whether an apparatus is connected to a network or not". On the other hand, the "a case where it has nothing to do with presence/non-presence of a network" means "a case where it does not rely on any network connection", i.e., "it does not matter whether it is connected to a network or not". The organization in step ST17 means that, regardless of a specified content or a specified value of a network condition, a plurality of pieces of threat information are regarded as the same threat information as long as the executioner of the threat and the execution condition are the same among the plurality of pieces of threat information. The executioner of the threat and the execution condition in each transition path of the threat analysis result are independent of each other and do not have any inclusion relationship.

When the organizing process is completed in step ST17, the threat model generation unit 14 stores the threat analysis result data as shown in FIGS. 14 and 15 in the threat evaluation index DB 23.

Further, the threat model generation unit 14 stores the threat occurrence model information as shown in FIGS. 11, 12, and 13 in the threat occurrence model DB 22.

(Evaluation Processing of Security Countermeasure Function)

(Preparation: Generation Processing of Sufficient Condition Table Information)

In the security countermeasure function evaluation apparatus 10, the evaluation point calculation unit 15 reads the sufficient condition table model-form information in which the countermeasure policy region, the selection region, and the point region are blank, as shown in FIG. 4, from the security countermeasure function evaluation index DB 24 in response to an operation performed with the input unit 11 by an estimator, and displays the sufficient condition table model-form information on the display unit 19.

The evaluation point calculation unit 15 writes countermeasure policy information to a countermeasure policy region of the sufficient condition table model-form information when receiving input of the countermeasure policy information for reducing an execution condition described in the information about the executioner of the threat and the execution condition in the threat analysis result data in response to an operation performed with the input unit 11 by an estimator while the sufficient condition table model-form information is displayed.

Further, the evaluation point calculation unit 15 selects a specified option in the selection region when any one of the options in the selection region (for example, periodic (item of operation timing), irrelevance (item of time)) is specified regarding a function name for execution and execution of countermeasure policy information written to the countermeasure policy region (for example, conditions such as operation timing, time) in response to an operation performed with the input unit 11 by an estimator. Each item of the conditions and the function names are independent from each other and do not have any inclusion relationship. The evaluation point calculation unit 15 can change items in the sufficient condition table in response to an operation performed with the input unit 11 by an estimator.

When an option is selected, the evaluation point calculation unit 15 describes, in the point region, a point corresponding to the option selected in the selection region on the basis of the sufficient condition evaluation parameter in the security countermeasure function evaluation index DB 24.

As a result, as shown in FIGS. 16, 17, an 18, the sufficient condition table information including the countermeasure policy region receiving the countermeasure policy information, the selection region in which options are selected, and the point region describing the points is generated as information in which the functions and the conditions that should be satisfied by the security countermeasure function in order to overcome threats are associated with the points thereof.

The sufficient condition table information is information in a table format obtained by selecting sufficient conditions to be satisfied and making them into points regarding the items of the functions and conditions that should be satisfied by any security countermeasure function for each countermeasure policy in order to reduce the execution condition in the threat analysis result.

The evaluation point calculation unit 15 saves the sufficient condition table information in the security countermeasure function evaluation index DB 24 in response to operation performed with the input unit 11 by an estimator.

Subsequently, in the following evaluation processing, a security countermeasure function with which each product is identified is evaluated on the basis of sufficient condition table information about any security countermeasure function.

(Evaluation Processing: FIG. 19)

In the security countermeasure function evaluation apparatus 10, when the input unit 11 receives a read command specifying countermeasure model-form information in response to an operation performed with the input unit 11 by an estimator, the evaluation point calculation unit 15 reads countermeasure model-form information from the security countermeasure function evaluation index DB 24 on the basis of the read command, and the countermeasure model-form information in which countermeasure names, targets, selection results of functions, and points are blank as shown in FIG. 5 is displayed on the display unit 19.

When the evaluation point calculation unit 15 receives an input of a countermeasure name representing a security countermeasure function of an evaluation target in response to an operation performed with the input unit 11 by an estimator while the countermeasure model-form information is displayed, the countermeasure name is written to the countermeasure name region in the countermeasure model-form information (ST21). Likewise, the target is also written to the target region.

Further, the evaluation point calculation unit 15 selects a specified option in a selection region when any one of the options in the selection region of the countermeasure model-form information is specified regarding execution of a countermeasure name written to the countermeasure name region and a function name for execution in response to an operation performed with the input unit 11 by an estimator (ST22). This selected option represents the feature of the security countermeasure function.

Figure 20:
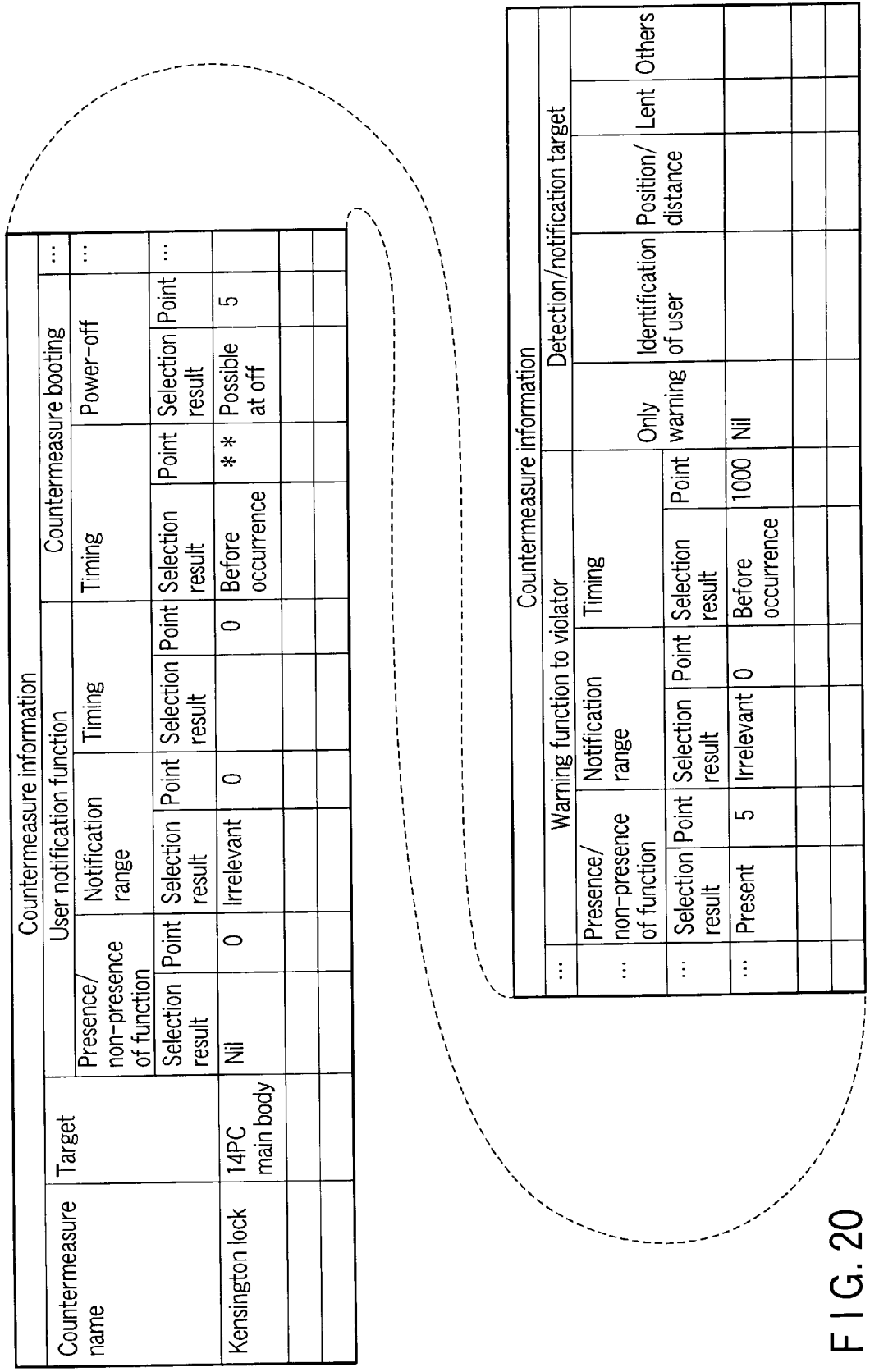
FIG. 20 is a schematic diagram illustrating an example of countermeasure information according to the embodiment.

The evaluation point calculation unit 15 describes, in the point region of the countermeasure model-form information, a point corresponding to an option selected in a selection region of the countermeasure model-form information, on the basis of the countermeasure function evaluation parameter in the security countermeasure function evaluation index DB 24. Accordingly, for the countermeasure name and the target representing the security countermeasure function, countermeasure information including a countermeasure name region into which a countermeasure name is input, a selection region in which an option is selected, a point region describing a point, is generated as shown in FIG. 20 while points are given to the respective items of the functions and the conditions. The evaluation point calculation unit 15 writes the countermeasure information to the security countermeasure function evaluation index DB 24 of the database unit 20.

Figure 21:
FIG. 21 is a schematic diagram illustrating an example of a calculation table including evaluation results according to the embodiment.

As shown in FIG. 21, the evaluation point calculation unit 15 calculates a difference obtained by subtracting a point in sufficient condition table information from a point in countermeasure information regarding the point region of the same item in the sufficient condition table information and the countermeasure information, and writes the difference to a difference field of a calculation table.

When the difference is equal to or more than zero, the evaluation point calculation unit 15 causes the evaluation result to be a point having a positive value. When the difference is less than zero, the evaluation point calculation unit 15 causes the evaluation result to be a point having a value zero. Accordingly, for each of the same items in the sufficient condition table information and the countermeasure information, the evaluation point calculation unit 15 writes the point of the evaluation result to the evaluation result field of the calculation table (ST23). In this example, when the difference is equal to or more than zero, the positive value of the evaluation result is a point "1". In other words, in this example, the calculation method for calculating the evaluation result is performed as follows. When the sufficient condition of the countermeasure policy is necessary but the countermeasure function does not satisfy the sufficient condition, the evaluation result is set at point "0". In the other cases, the evaluation result is set at point "1". However, the positive value of the evaluation result is not limited to point "1". The positive value of the evaluation result may be any weighting value. In other words, when the evaluation result is a point of a positive value, the evaluation point calculation unit 15 may adopt a weighting value set for each item in advance as a point of a corresponding evaluation result.

Further, as shown in FIG. 22, the evaluation point calculation unit 15 calculates a mean value of points in the evaluation results for respective functions of each piece of countermeasure policy information, writes the mean value to a mean value field of the calculation table, calculates a summation of all the mean values, and calculates an evaluation point (ST24). Then, this evaluation point is written to the evaluation point field of the calculation table. In the calculation process of mean values, weights may be assigned to the points in the evaluation results, and a point of a desired evaluation result may be removed from the calculation expression of the mean values.

In any case, the evaluation point calculation unit 15 calculates the evaluation point of the security countermeasure function for each piece of countermeasure policy information.

(Simulation Calculation)
(Preparation 1: Setting Transition Parameter)

In the security countermeasure function evaluation apparatus 10, the transition probability calculation unit 16 calculates a transition probability prior to countermeasure as follows. Before a security countermeasure function is implemented on the information processing apparatus in response to an operation performed with the input unit 11 by an estimator, on the basis of the threat analysis result data, the number of the same pieces of transition source security state information is adopted as a denominator value, and the number of the same pieces of transition destination security state information having the common transition source is adopted as a numerator value. Then, the numerator value is divided by the denominator value, whereby the transition probability prior to countermeasure is calculated.

For example, as shown in FIGS. 14 and 24, the number of the same pieces of transition source security state information "P1", i.e., "16", is adopted as a denominator value, and the number of the same pieces of transition destination security state information "P7" having the common transition source, i.e., "8", is adopted as a numerator value. Then, the numerator value "8" is divided by the denominator value "16", whereby the transition probability prior to countermeasure "0.5" is calculated.

Likewise, the transition probability calculation unit 16 calculates a transition probability after countermeasure as follows. After a security countermeasure function is implemented on the information processing apparatus in response to an operation performed with the input unit 11 by an estimator, the evaluation point is subtracted from the value of the numerator used for calculating the transition probability prior to countermeasure, and accordingly, the value of the numerator is corrected. Then, the value of this corrected numerator is divided by the value of the denominator, whereby the transition probability after countermeasure is calculated.

For example, as shown in FIGS. 23 and 25, the evaluation point "1" is subtracted from the value of the numerator "8" used for calculating the transition probability prior to countermeasure, and accordingly, the value of the numerator is corrected. Then, the value of this corrected numerator "7" is divided by the value of the denominator "16", whereby the transition probability after countermeasure "0.4375" is calculated.

Now, the steps for calculating the transition probability will be explained in detail.

First, in the security countermeasure function evaluation apparatus 10, the transition probability calculation unit 16 sets a transition parameter while referencing the threat occurrence model DB 22 and the security countermeasure function evaluation index DB 24 in response to an operation performed with the input unit 11 by an estimator.

As shown in FIG. 23, the transition parameters include a transition source security condition IDa1, a transition destination security condition IDa2, a value representing the ease of transition a3 based on the number of threats prompting transition (before countermeasure) (=the number of pieces of "the information about the executioner of the threat and the execution condition"), a value representing the ease of transition a4 based on the number of threats prompting transition (after countermeasure) (=the number of pieces of "the information about the executioner of the threat and the execution condition"), a value representing the ease of transition a5 based on the number of threats prompting transition (during recovery), a summation of evaluation points a6, and the number of recoveries a7.

The value representing the ease of transition a3 is set at "0" when there is no transition on the basis of the threat occurrence model information in the threat occurrence model DB 22, and when transition occurs regardless of condition, the value representing the ease of transition a3 is set as the number of pieces of "the information about the executioner of the threat and the execution condition", in units of "1". For example, in FIG. 23, when the state changes from the transition source security condition ID "P1" to the transition destination security condition ID "P5", the value representing the ease of transition a3 is "2". As shown in FIG. 14 and the like, this shows that transition is likely to occur for the two pieces of "the information about the executioner of the threat and the execution condition".

When the state is maintained at the safe state (i.e., both of the transition source state a1 and the transition destination state a2 are P1), the value (3.5) representing the ease of transition a4 after countermeasure is applied is obtained as (3.5=1+2.5) by adding a value a3 (1), to which countermeasure is not yet applied, to a value of a summation of evaluation points a6 (2.5=1+1.5). In other words, when the state is maintained at the safe state, the value representing the ease of transition a4 after countermeasure is applied reflects the fact that the probability of staying at the safe state increases due to the effect of suppressing the threat with the countermeasure.

When the state is changed, the value representing the ease of transition a4 after countermeasure is applied is a value obtained by subtracting the summation of evaluation points a6 from the value a3 prior to the countermeasure.

The value representing the ease of transition a5 is set at "0" when there is no transition on the basis of the recovery model information in the recovery model DB 25, and when transition occurs regardless of condition, the value representing the ease of transition a5 is set at the number of pieces in unit of "1".

The summation of evaluation points a6 is set at a value of a summation of evaluation points of respective countermeasure names for each countermeasure policy. For example, when two products having separate countermeasure names are used simultaneously, values obtained by adding, for each countermeasure policy, two evaluation points calculated for each countermeasure policy of the two countermeasure names (summation values of evaluation points of the respective countermeasure policies of the two products) are set.

(Preparation 2: Calculation of Transition Probability)

When a transition parameter is set, the transition probability calculation unit 16 calculates a transition probability on the basis of a transition parameter.

FIG. 24 is a schematic diagram illustrating a calculation table of transition probabilities using transition parameters prior to countermeasure. The calculation table of transition probabilities include a transition source security condition ID b1, a transition destination security condition ID b2, a transition rate b3, a numerator of transition probability b4, a denominator of transition probability b5, a transition probability b6, a transition probability (total value) b7, the number of successful passes b8, and a rate of successful pass b9.

Although not existing in the real world, a start point state P0 is assumed in FIG. 24. At the start point state P0, the state changes to only a state where the security state is safe. This start point state P0 is adopted as an initial state of the simulation, and is set as a part of the transition source security condition ID b1.

When there is transition path information from a certain transition source security condition ID b1 to one or more different transition destination security condition IDs b2, the value of the transition probability b6 is calculated from the transition rate b3 based on the number of pieces of "the information about the executioner of the threat and the execution condition" between the respective security condition IDs b1, b2 as a rate of movement to the respective transition destination security condition IDs b2.

More specifically, as shown in FIG. 23, the value of the ease of transition a3 based on the number of threats (before countermeasure) (=the number of pieces of "the information about the executioner of the threat and the execution condition") is copied to the transition rate b3. Likewise, the value a3 is copied to the numerator of transition probability b4.

A total value obtained by adding the values of the numerators of transition probabilities b4 in rows having the same value of the transition source security condition ID b1 is input to the value of the denominator of transition probability b5.

For example, there are two rows having the transition source security condition ID b1 "P0", and the total value "2" obtained by adding the values of the numerators of transition probabilities b4 in these rows is input to the value of the denominators of transition probability b5.

A division result obtained by dividing the value of the numerator of transition probability b4 by the value of the denominator of transition probability b5 is input to the value of the transition probability b6.

In summary, the value of the transition probability b6 is a value obtained by dividing the number of pieces of "the information about the executioner of the threat and the execution condition" of a certain combination of transition source and transition destination security condition IDs (a set of values b3) by the total number (the value of b4) of the number of pieces of "the information about the executioner of the threat and the execution condition" (multiple sets of values b3) of the plurality of sets of transition source and transition destination security condition IDs having the transition source security condition ID.

A result of a total value of transition probabilities b6 in rows having the same transition source security condition ID b1 is input to the transition probability (total value) b7.

FIG. 25 is a schematic diagram illustrating a calculation table of transition probabilities using transition parameters after countermeasure of FIG. 23. In contrast to FIG. 24, values b3' to b9' are values after countermeasure is applied.

For example, when there is transition path information from a certain transition source security condition ID b1 to one or more different transition destination security condition IDs b2, the transition probability b6' is not calculated from the transition rate b3 based on the number of pieces of "the information about the executioner of the threat and the execution condition" between the respective security condition IDs b1, b2 but is calculated from the transition rate b3' based on a value obtained by subtracting an effect of a countermeasure function (an evaluation point) from the number of pieces of "the information about the executioner of the threat and the execution condition" between the respective security condition IDs b1, b2, as a rate of movement to the respective transition destination security condition IDs b2. When the effect of the countermeasure function is more than the number of pieces of "the information about the executioner of the threat and the execution condition" prior to countermeasure, it is calculated from the transition rate b3' having a value "0" meaning no transition.

More specifically, as shown in FIG. 23, the value of the ease of transition a4 based on the number of threats (after countermeasure) (=the number of pieces of "the information about the executioner of the threat and the execution condition") is copied to the transition rate b3' after countermeasure is applied. Likewise, the value a4 is copied to the numerator of transition probability b4'.

The denominator of transition probability b5', the transition probability b6', and the transition probability (total value) b7' are the values b5', b6', b7', respectively, after countermeasure is applied which are obtained based on the values b5, b6, b7 before countermeasure is applied.

In any case, the transition probability is calculated by the transition probability calculation unit 16.

Thereafter, the transition probability calculation unit 16 displays the transition probability prior to countermeasure and the transition probability after countermeasure on the display unit 19.

Further, the transition probability calculation unit 16 makes use of the calculation of the transition probabilities as shown in FIG. 24 and FIG. 25 to compare the transition probability before security countermeasure b6 and the transition probability after security countermeasure b6' for each piece of transition path information (between b1 and b2), and can determine the effect and the effectiveness of the security countermeasure function in accordance with the degree of decrease of the transition probabilities before and after the countermeasure is applied.

Further, the transition probability calculation unit 16 can display, on the display unit 19, the transition probability prior to countermeasure and the transition probability after countermeasure using any visual representation, such as a radar chart and a bar graph, so as to compare each of the same sets of the transition source security state information and the transition destination security state information.

(Simulation Processing: FIG. 26)

In the security countermeasure function evaluation apparatus 10, the simulation execution unit 17 sets the number of tried simulations, such as 1000 times, to the storage unit 13 in response to an operation performed with the input unit 11 by an estimator (ST31). When the number of tries increases, an error is reduced between the transition probability obtained from the simulation and the transition probability obtained from calculation.

The simulation execution unit 17 sets the maximum value of the number of transition steps, such as four times, to the storage unit 13 in response to an operation performed with the input unit 11 by an estimator (ST32). The maximum value of the number of transition steps is set at the same value as the maximum value of the number of pieces of transition path information used for changing the state from the start point state P0 to any one of the ultimate destination states (hereinafter referred to as the maximum number of pieces of transition path information). For example, in the threat occurrence model information as shown in FIG. 11, four pieces of transition path information is used at the maximum in the transition process starting from the start point PC, not shown, via the states P1, P2, P5, and to the ultimate destination state P6. Accordingly, the maximum number of pieces of transition path information is four.

Thereafter, the simulation execution unit 17 repeatedly executes the simulation processing from steps ST33 to ST41 until the maximum value of the number of transition steps is attained.

The simulation execution unit 17 generates a random number from 0 to 1, inclusive (ST33).

In the first try, the simulation execution unit 17 references "the calculation table of transition probabilities before countermeasure" in the security countermeasure function evaluation index DB 24, and compares the random number with the value of the transition probability (total value) when the transition source security condition in the calculation table is in the start point state P0, thus determining whether the value of the transition probability is less than the random number or not (ST34). In the second and subsequent tries, the simulation execution unit 17 uses the value of the transition probability when the transition source security condition in the "calculation table of transition probabilities before countermeasure" as described above is in the transition destination state after the simulation is executed. When the value of the transition probability (total value) is determined to be equal to or more than the random number as a result of the determination, the simulation execution unit 17 returns back to the processing of step ST34 again.

When the value of the transition probability (total value) is determined to be less than the random number as a result of the determination of step ST34, the simulation execution unit 17 defines the transition destination state as a subsequent transition destination state (ST35).

The simulation execution unit 17 counts "the number of successful passes" of the transition source state once (ST36), and increases the value of the number of successful passes b8 of the transition source state in the calculation table described above by one.

Thereafter, the simulation execution unit 17 repeats the processing of steps ST37 to ST41 for the number of tried simulations.

The simulation execution unit 17 generates a random number from 0 to 1, inclusive (ST37).

The simulation execution unit 17 compares the random number with the value of the transition probability (total value) of the current transition source state in the "calculation table of transition probabilities before countermeasure", and determines whether the value of the transition probability is less than the random number (ST38). When the value of the transition probability (total value) is determined to be equal to or more than the random number as a result of the determination, the simulation execution unit 17 returns back to the processing of step ST38 again.

When the value of the transition probability (total value) is determined to be less than the random number as a result of the determination of step ST38, the simulation execution unit 17 defines the transition destination state as a subsequent transition destination state (ST39).

The simulation execution unit 17 counts "the number of successful passes" of the transition source state once (ST40), and increases the value of the number of successful passes b8 of the transition source state in the calculation table described above by one.

When the transition source state and the transition destination state are the same, the simulation execution unit 17 counts "the number of self transitions" of the transition source state once (ST41).

The simulation execution unit 17 determines whether the total value of the number counted in steps ST36, ST40, ST41 has reached the maximum value of the number of transition steps set in step ST32 (ST42). When the total value is determined not to reach the maximum value of the number of transition steps, step ST37 is subsequently performed.

When the total value is determined to reach the maximum value as a result of the determination in step ST42, the simulation execution unit 17 increases the value of the number of times (the ultimate number of times the ultimate destination state is reached) the maximum value is reached (ultimate destination state) by one, and determines whether the total value of the ultimate number of times each ultimate destination state is reached satisfies the number of tries set in step ST31 or not (ST43). When the total value does not satisfy the number of tries, step ST33 is subsequently performed.

When the number of tries is satisfied as a result of the determination in step ST43, the simulation execution unit 17 terminates the processing.

FIG. 27 is a schematic diagram illustrating an example of a simulation result prior to countermeasure. As shown in the figure, for each security condition $c_1$, the following items are generated as a simulation result: the ultimate number of times the ultimate destination state is reached (the number of tries the state in question is the ultimate destination point) $c_2$, an ultimate destination reaching probability $c_3$, the number of times $c_4$ the state $c_1$ is passed, a pass probability $c_5$, the number of self transitions $c_6$, and a self transition probability (measured value) $c_7$.

In this case, the pass probability $c_5$ and the self transition probability $c_7$ are calculated according to the following expression:

the pass probability $c_5$=the number of times $c_4$ the state $c_1$ is passed/(the total value of the ultimate number of times $c_2$ the ultimate destination state is reached); and self transition probability $c_7$=the number of self transitions $c_6$/(the number of times $c_4$ the state $c_1$ is passed+the number of self transitions $c_6$−the ultimate number of times the ultimate destination state is reached $c_2$).

The total value of the ultimate number of times the ultimate destination state is reached $c_2$ is the same as the number of tries set in step ST31 (the total value of the ultimate number of times the ultimate destination state is reached c2=the number of tries).

The value obtained by multiplying the number of tries set in step ST31 by the maximum value set in step ST32 is a value obtained by adding the total value of the number of times c4 the state c1 is passed and the total value of the number of self transitions c6 (the number of tried simulations×maximum value=the total value of the number of times c4 the state c1 is passed+the total value of the number of self transitions c6).

The self transition probability (theoretical value) c8 is a value obtained by copying the transition probability b6 of FIG. 24 for comparison, and is used as a reference for determining adequateness of the number of tried simulations on the basis of an error with respect to the self transition probability (measured value) c7.

FIG. 28 is a schematic diagram illustrating an example of a simulation result after countermeasure. In contrast to each value as shown in FIG. 27, the values c2' to c8' are values after the countermeasure is applied.

For example, the self transition probability (theoretical value) c8' is a value obtained by copying the transition probability b6' of FIG. 25 for comparison, and is used as a reference for determining adequateness of the number of tried simulations on the basis of an error with respect to the self transition probability (measured value) c7'.

Figure 29:
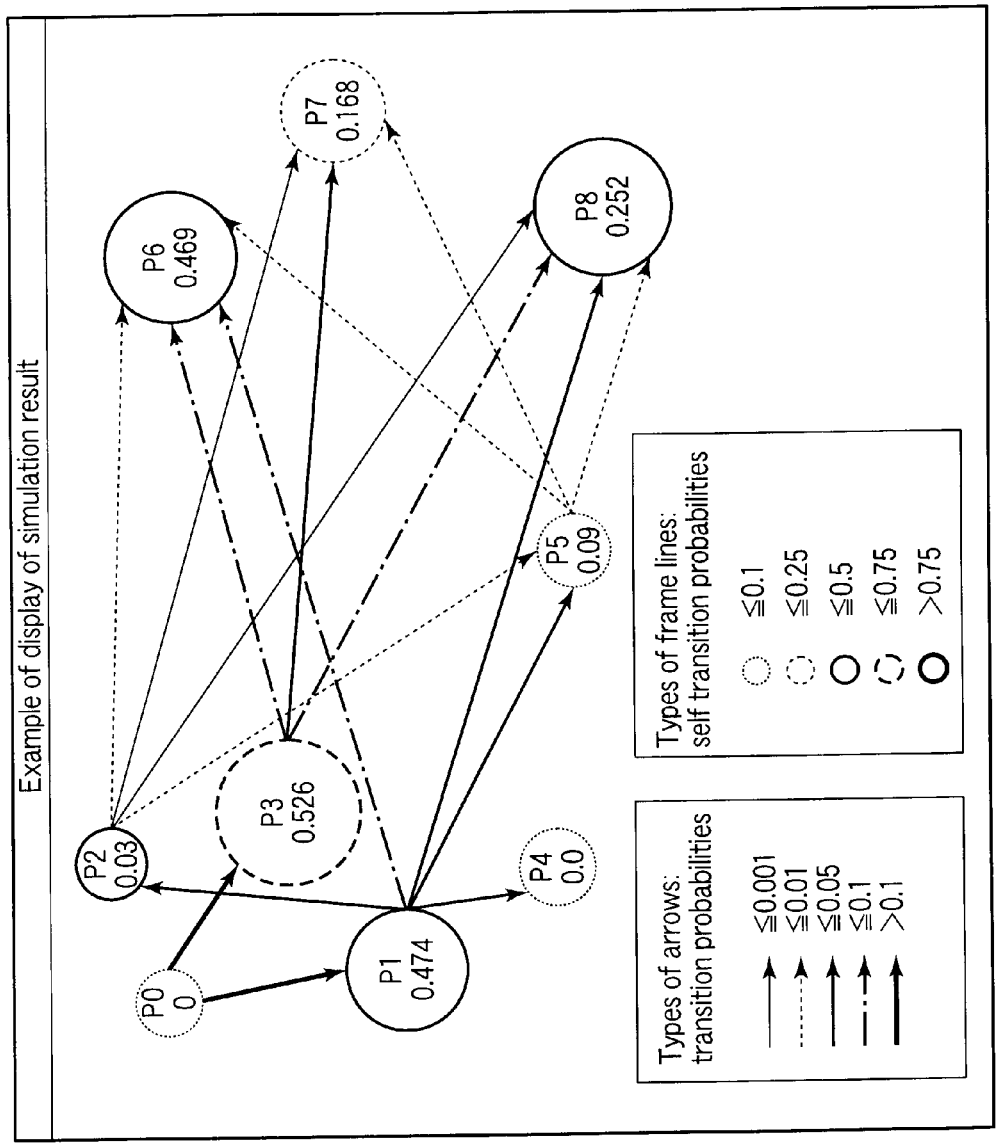
FIG. 29 is a schematic diagram illustrating an example of visual representation of a simulation result according to the embodiment.

The simulation execution unit 17 is not limited to the table format as shown in FIG. 27 or 28. Alternatively, a simulation result can be displayed on the display unit 19 as a visual representation as shown in FIG. 29. In the simulation result, the following items are drawn: the ultimate destination state c1 as shown in FIG. 28, the ultimate destination reaching probability c3', the self transition probability c7', states (c1) and numerical values (c3') in circular frame lines, radiuses (c3') in circular frame lines, types in circular frame lines (c7'), and arrow lines (c7') of transition pass on the basis of the transition probability b6' of the transition pass. However, the simulation result is not limited to the representation as shown in FIG. 29. Alternatively, it may be shown as any visual representation, such as a radar chart or bar graph. In a case where there is an effect of a security countermeasure function and a case where there is no effect of the security countermeasure function, the simulation execution unit 17 may use values obtained by comparing simulation results, and it may be shown as a display as shown in FIG. 29, or any visual representation, such as a radar chart or bar graph on the display unit 19.

(Generation Processing of Recovery Model Information: FIG. 30)

The security countermeasure function evaluation apparatus 10 is not limited to generation of the threat occurrence model information and the calculation of the transition probability based on the threat occurrence model information. Alternatively, the security countermeasure function evaluation apparatus 10 may generate recovery model information and execute calculation of transition probabilities based on the recovery model information.

In the security countermeasure function evaluation apparatus 10, when the input unit 11 receives a selection command of a security protection target asset including a specification of a security protection target asset in response to operation performed with the input unit 11 by an estimator, the recovery model generation unit 18 selects security protection target asset information from the protection target asset DB 21 of the database unit 21 on the basis of the selection command (ST51), and displays the security protection target asset information on the display unit 19.

When the recovery model generation unit 18 receives a security condition ID in response to an operation performed by an estimator while the security protection target asset information is displayed, the recovery model generation unit 18 extracts, on the basis of the security condition ID, security state information related to the displayed security protection target asset information from the threat occurrence model information of the threat occurrence model DB 22 (ST52).

The recovery model generation unit 18 displays the security condition ID of the extracted security state information on the display unit 19. At this occasion, the security condition ID is displayed without any outer frame information.

When the input unit 11 receives input of a specification of safe, danger, and damage occurrence groups in response to an operation performed by an estimator for each security condition ID displayed, the recovery model generation unit 18 classifies, on the basis of the specification, each security condition into any one of safe, danger, and damage occurrence groups (ST53).

The recovery model generation unit 18 displays outer frame information in a format according to each classified group on the display unit 19 by adding it to the displayed security condition ID. As described above, examples of outer frame information may use any formats such as a solid line (safety), an alternate long and short dash line (danger), and a broken line (damage occurrence).

Subsequently, when the recovery model generation unit 18 receives input of a specification of displayed outer frame information in response to an operation performed with the input unit 11 by an estimator, the recovery model generation unit 18 uses a form of an arrow extending from the outer frame information in the format according to the danger or damage occurrence to the outer frame information according to the safety group on the basis of this specification, thereby drawing transition path information (third transition path information) between the two pieces of outer frame information (drawing an arrow) (ST54). The transition path information is arrows in only two kinds of directions, i.e., a direction from "danger" to "safety" and a direction from "damage occurrence" to "safety". The transition path information corresponds to a recovery function. The recovery function means a security countermeasure function having an effect of promoting transition between security conditions in a direction to a safe state. It should be noted that there are two kinds of directions of transition path information corresponding to recovery functions. However, like the above, any type (for example, a solid line, a broken line, an alternate long and short dash line, and a thick line) can be used as the types of arrow lines.

When the recovery model generation unit 18 receives input of recovery function requirement information representing a recovery countermeasure policy such as "PR1; recovering information processing apparatus" for each piece of transition path information in response to an operation performed with the input unit 11 by an estimator after transition path information is drawn, the recovery model generation unit 18 associates the transition path information with the recovery function requirement information (ST55).

It should be noted that the recovery function requirement information is a function requirement that is deemed to be insufficient in a security protection target asset corresponding to transition source security state information as a result of comparison between the transition source security state information and the transition destination security state information. In other words, the recovery function requirement information is a function requirement needed for executing a countermeasure policy promoting transition in a direction to a safe state, and is a function requirement that is added to a security protection target asset in a dangerous state or a damage occurrence state to enable transition of the security protection target asset to the safe state. The recovery function requirement is organized so that the recovery function requirement is deemed to be the same recovery function requirement when a plurality of recovery function requirements deemed to be insufficient for the transition source security condition are completely the same between the transition source and transition destination security conditions (ST56). This organizing process is executed by the recovery model generation unit 18 in response to an operation performed with the input unit 11 by an estimator.

Figure 31:
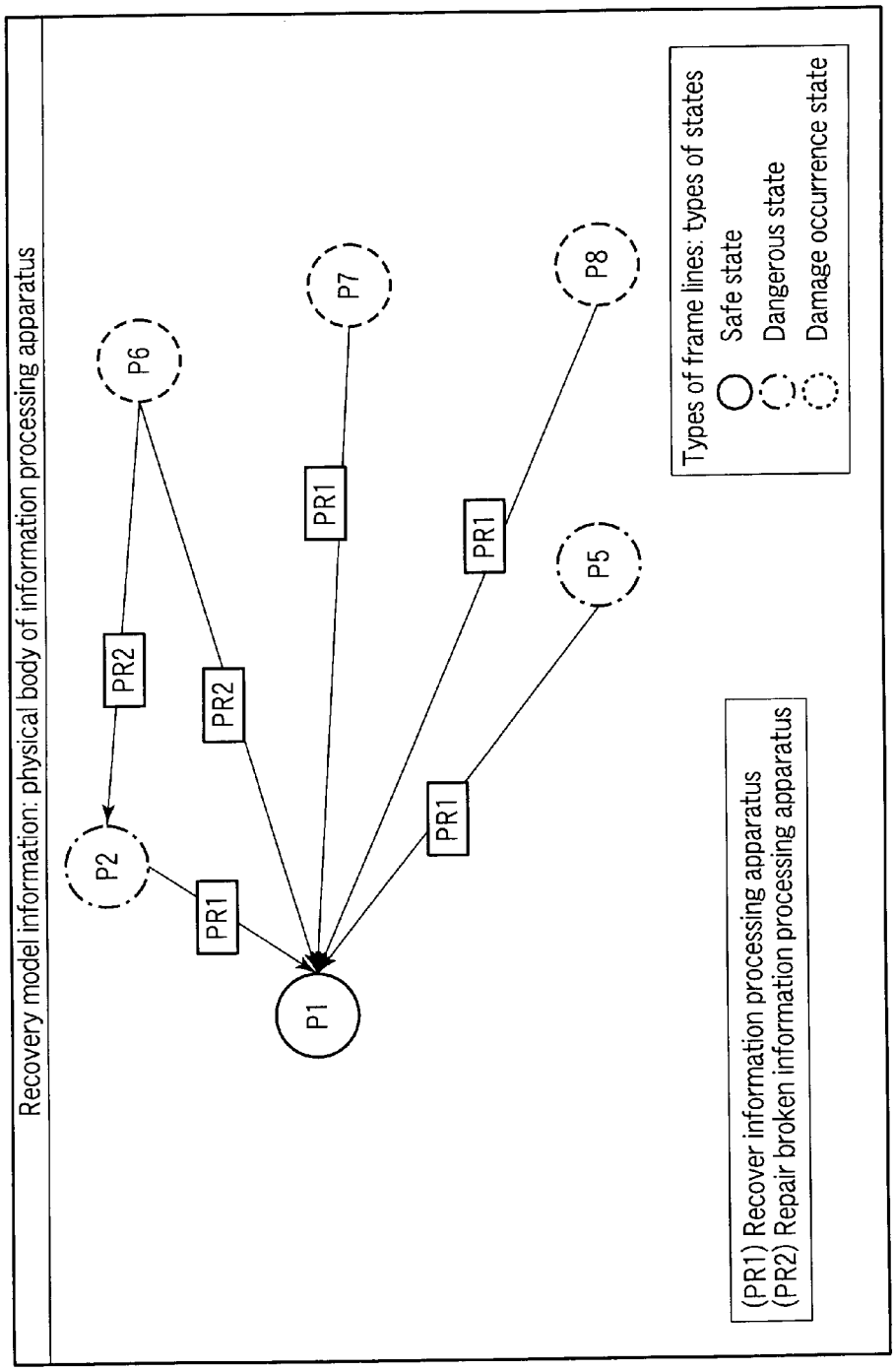
FIG. 31 is a schematic diagram illustrating an example of recovery model information according to the embodiment.
Figure 32:
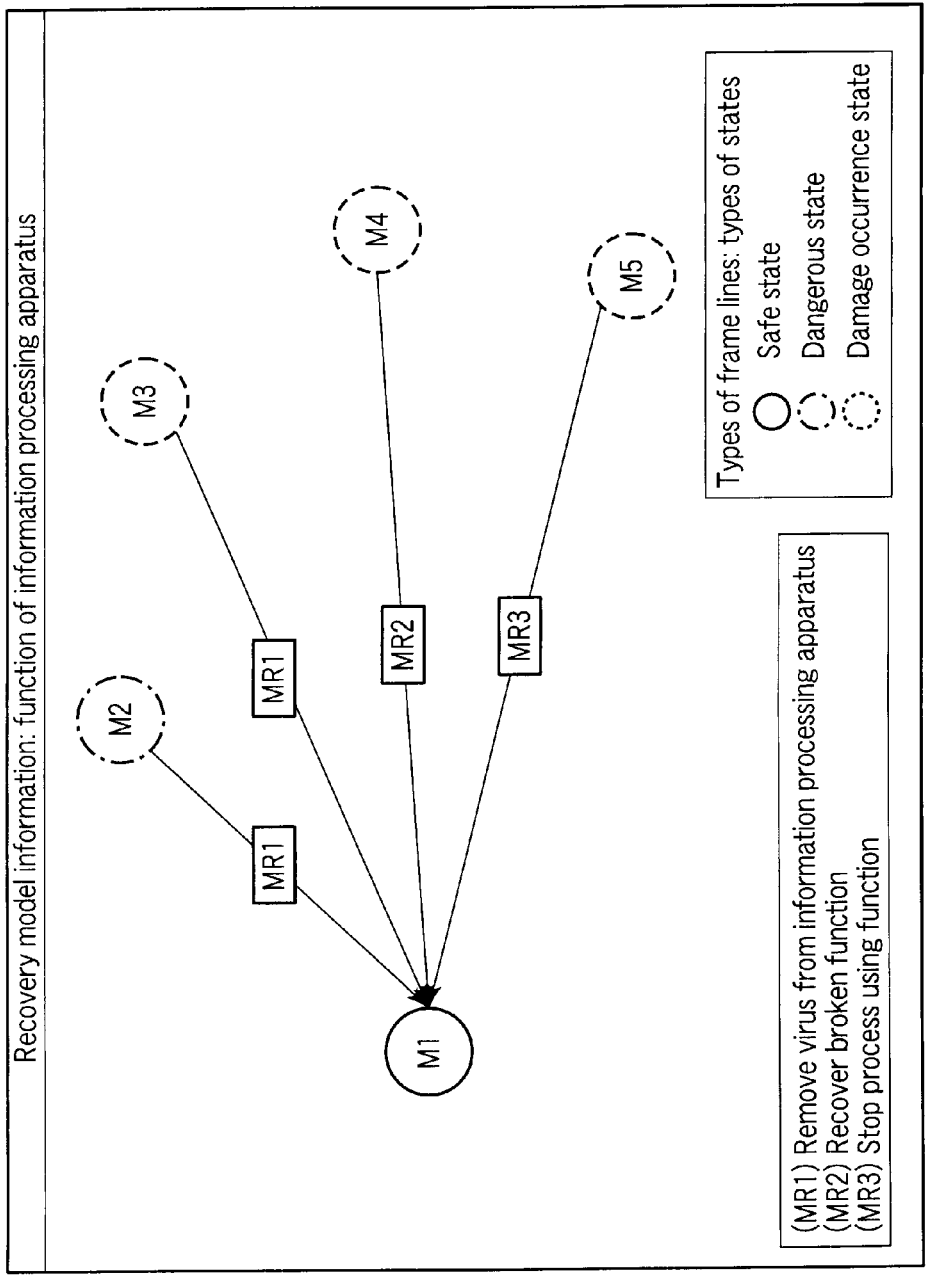
FIG. 32 is a schematic diagram illustrating an example of recovery model information according to the embodiment.
Figure 33:
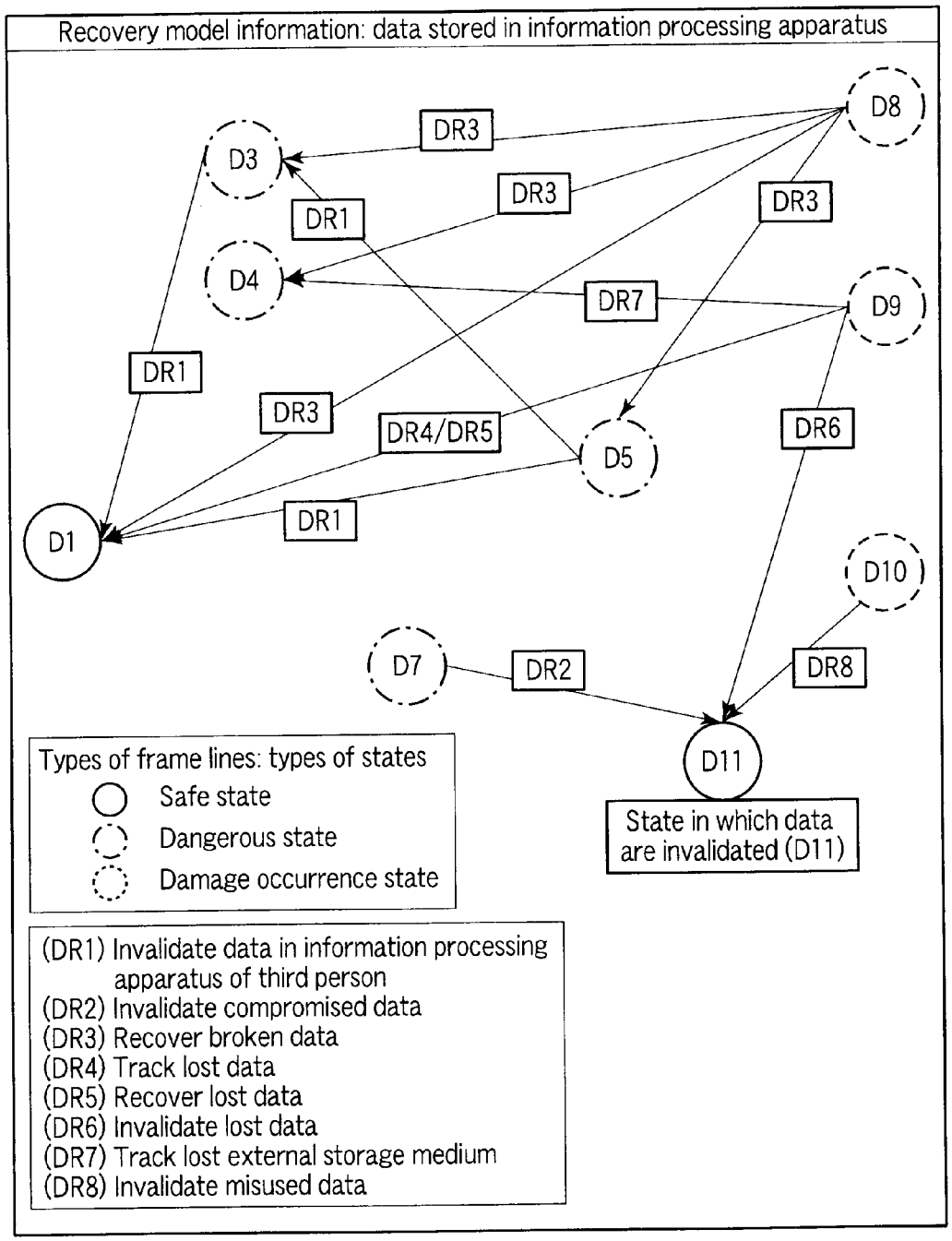
FIG. 33 is a schematic diagram illustrating an example of recovery model information according to the embodiment.

In any case, by associating the transition path information and the recovery function requirement information, the recovery model generation unit 18 generates recovery model information including a plurality of pieces of security state information, outer frame information, transition path information, and recovery function requirement information, which are associated with each other as shown in FIG. 31, 32, or 33. The recovery model information is displayed by the display unit 19.

Subsequently, in response to an operation performed with the input unit 11 by an estimator, as shown in FIG. 6, the recovery model generation unit 18 reads the recovery sufficient condition table model-form information from the security countermeasure function evaluation index DB 24 of the database unit 20, and inputs the recovery function requirement information in the recovery model information to the recovery countermeasure policy region of the recovery sufficient condition table model-form information.

Further, when the recovery model generation unit 18 receives input of the recovery sufficient condition information for each of items of the type of log, target of tracking function, and backup in response to an operation performed with the input unit 11 by an estimator, the recovery model generation unit 18 writes the recovery sufficient condition information to the sufficient condition region of the recovery sufficient condition table model-form information.

Further, in response to an operation performed with the input unit 11 by an estimator, as shown in FIG. 7, the recovery model generation unit 18 reads the recovery (cause investigation) sufficient condition table model-form information from the security countermeasure function evaluation index DB 24 of the database unit 20, and displays the recovery (cause investigation) sufficient condition table model-form information on the display unit 19.

When the recovery model generation unit 18 receives input of countermeasure policy information for cause investigation in response to an operation performed with the input unit 11 by an estimator, the recovery model generation unit 18 inputs the countermeasure policy information to the recovery (cause investigation) countermeasure policy region.

Further, when the recovery model generation unit 18 receives input of recovery (cause investigation) sufficient condition information for each of items of the type of log, target of tracking function, and backup in response to an operation performed with the input unit 11 by an estimator, the recovery model generation unit 18 writes the recovery (cause investigation) sufficient condition information to the sufficient condition region of the recovery (cause investigation) sufficient condition table model-form information. The recovery (cause investigation) sufficient condition information is information representing track of threat. The recovery (cause investigation) sufficient condition information is organized such that the recovery (cause investigation) sufficient condition information is the condition of the same cause investigation when the information representing trace of threat is completely the same between a plurality of recovery functions. Like the above, this organizing process is executed by the recovery model generation unit 18 in response to an operation performed with the input unit 11 by an estimator.

Therefore, as shown in FIGS. 34 and 35, the recovery model generation unit 18 writes the recovery sufficient condition table information including the recovery countermeasure policy region and the sufficient condition region having the recovery sufficient condition information to the security countermeasure function evaluation index DB 24 of the database unit 20.

The recovery model generation unit 18 saves the recovery model information to the recovery model DB 25.

Subsequently, like the above, in the following evaluation processing, the security countermeasure function for identifying each product is evaluated on the basis of recovery sufficient condition table information of any security countermeasure function.

(Evaluation Processing)

In the security countermeasure function evaluation apparatus 10, when the input unit 11 receives a selection command including a specification of a security countermeasure function to be evaluated in response to an operation performed with the input unit 11 by an estimator, the evaluation point calculation unit 15 selects the recovery countermeasure model-form information from the security countermeasure function evaluation index DB 24 on the basis of the selection command, and displays the recovery countermeasure model-form information on the display unit 19. As shown in FIG. 8, in the recovery countermeasure model-form information, the countermeasure name, each item of the type of log (target, position, user, time, storage location), target of tracking function, target of backup, and other functions are blank.

When the evaluation point calculation unit 15 receives input of the countermeasure name for the recovery countermeasure model-form information in response to an operation performed with the input unit 11 by an estimator while the recovery countermeasure model-form information is displayed, the evaluation point calculation unit 15 writes the countermeasure name to the countermeasure name region of the recovery countermeasure model-form information.

When the evaluation point calculation unit 15 receives the specification of the recovery sufficient condition information as an option of each item in the recovery countermeasure model-form information in response to an operation performed with the input unit 11 by an estimator, the evaluation point calculation unit 15 selects this specified recovery sufficient condition information. This option uses the recovery sufficient condition information in the recovery sufficient condition table information in the security countermeasure function evaluation index DB 24.

Accordingly, as shown in FIG. 36, the evaluation point calculation unit 15 writes, to the security countermeasure function evaluation index DB 24 of the database unit 20, the recovery countermeasure information including the countermeasure name region receiving input of the countermeasure name and the selection region in which the recovery sufficient condition information is selected.

As shown in FIGS. 37 and 38, the evaluation point calculation unit 15 writes a point of an evaluation result for each of the same items in recovery function requirement information in the recovery countermeasure policy region of the recovery sufficient condition table information, wherein when the recovery sufficient condition information in the recovery sufficient condition table information in each of the same items in the recovery sufficient condition table information and in the recovery countermeasure information matches recovery sufficient condition information in the recovery countermeasure information, the evaluation result is adopted as a point of a positive value, and when both do not match each other, the evaluation result is adopted as a point of a value zero. In this example, the positive value of the evaluation result is a point "1". However, the positive value of the evaluation result is not limited to point "1". The positive value of the evaluation result may be any weighting value. In other words, when the evaluation result is a point of a positive value, the evaluation point calculation unit 15 may adopt a weighting value set for each item in advance as a point of a corresponding evaluation result.

As shown in FIG. 39, the evaluation point calculation unit 15 calculates an evaluation point by adding points of all the evaluation results for each piece of recovery function requirement information, and writes the evaluation point to the evaluation point region. Alternatively, in the calculation process of evaluation points, weights may be assigned to the points in the evaluation results, and a point of a desired evaluation result may be removed from the calculation expression of the evaluation point.

In any case, the evaluation point calculation unit 15 calculates the evaluation points of the recovery function and the cause investigation condition for each recovery function requirement information of the countermeasure policy region.

(Simulation Calculation)

Like the above, regarding the recovery function, the transition probability calculation unit 16 can calculate transition probabilities before and after a countermeasure is applied, and can execute the simulation calculation based on the transition probability. In other words, the transition probability calculation unit 16 calculates a transition probability prior to countermeasure as follows. Before a security countermeasure function is implemented on the information processing apparatus, on the basis of the recovery model information, the number of pieces of recovery function requirement information related to the same transition source security state information is adopted as a denominator value, and the number of pieces of recovery function requirement information related to the same transition destination security state information having the common transition source is adopted as a numerator value. Then, the numerator value is divided by the denominator value, whereby the transition probability prior to countermeasure is calculated.

For example, as shown in FIG. 31, the number of pieces of recovery function requirement information "PR2" related to the same piece of transition source security state information "P6", i.e., "1", is adopted as a denominator value, and the number of pieces of recovery function requirement information "PR2" related to the same transition destination security state information "P1" having the common transition source, i.e., "1", is adopted as a numerator value. Then, the numerator value is divided by the denominator value, whereby the transition probability prior to countermeasure "1" is calculated.

Likewise, the transition probability calculation unit 16 can calculate a transition probability after countermeasure as follows. After a security countermeasure function is implemented on the information processing apparatus, the value of the numerator used for calculation of the transition probability prior to countermeasure is multiplied by the evaluation point, whereby the value of the numerator is corrected, and this corrected value of the numerator is divided by the value of the denominator serving as the number of pieces of recovery function requirement information.

For example, as shown in FIGS. 31 and 39, the value of the numerator "1" used for calculation of the transition probability prior to countermeasure is multiplied by the evaluation point "0", whereby the value of the numerator is corrected. This corrected value of the numerator "0" is divided by the value of the denominator "1" serving as the number of pieces of recovery function requirement information, so that the transition probability after countermeasure is obtained as "0".

Further, the transition probability calculation unit 16 displays the transition probability prior to countermeasure and the transition probability after countermeasure on the display unit 19. In this case, the transition probability calculation unit 16 may display, on the display unit 19, the transition probability prior to countermeasure and the transition probability after countermeasure using a radar chart or a bar graph on the basis of the recovery model information and the evaluation points so as to compare each of the same sets of the transition source security state information and the transition destination security state information.

Figure 40:
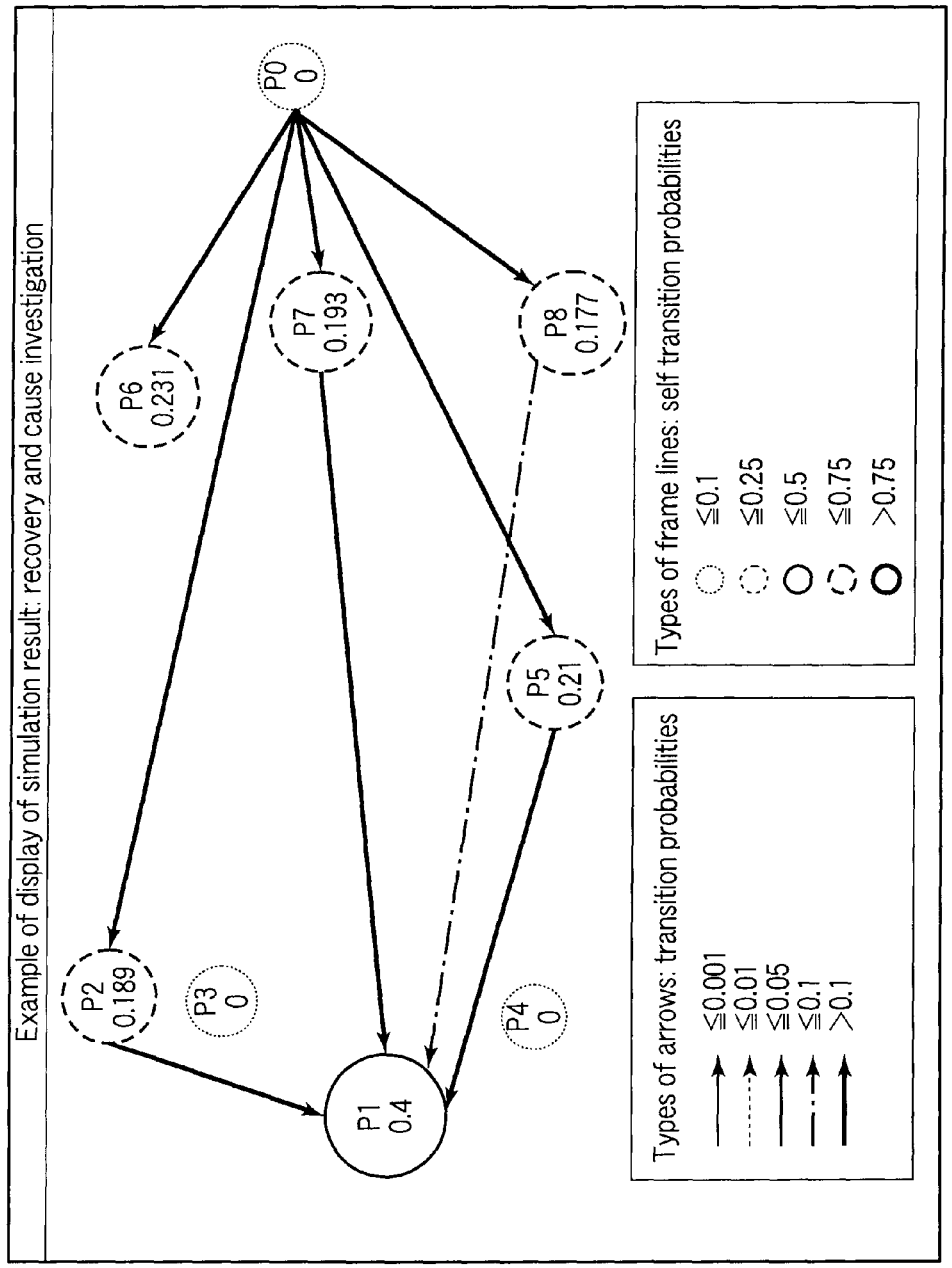
FIG. 40 is a schematic diagram illustrating an example of visual representation of a simulation result according to the embodiment.

Further, regarding the recovery function, the simulation execution unit 17 can not only execute the simulation calculation based on the calculation result of the transition probability as described above but also display the simulation result as shown in FIG. 40.

According to the present embodiment as described above, an evaluation is made as to whether each item of the countermeasure information representing the security countermeasure function in detail satisfies each item of the sufficient condition table information, and the evaluation points are calculated from the evaluation results of the respective items, whereby the transition probabilities are calculated based on the evaluation points. In this configuration, even an inexperienced estimator can evaluate each item of the security countermeasure function of the evaluation target in detail, and therefore, the effect of the security countermeasure function can be evaluated without relying on the level of skill of an estimator.

For each transition path information, the transition probabilities before and after the countermeasure are calculated, and the transition probabilities before and after the countermeasure can be compared, so that the effect of the security countermeasure function can be evaluated quantitatively.

Further, security countermeasure functions having similar effects are compared with each other. Therefore, a higher degree of universality is provided, and this better suits the purpose of use of the information processing apparatus. Further, a determination for selecting a better security countermeasure function can be supported.

Still further, in the future, according to the progress made in the security countermeasure function and the change in the threats, the security countermeasure functions can be easily reevaluated, and moreover, they can be compared with the evaluation results of the security countermeasure functions of the past.

In this explanation about the present embodiment, one security countermeasure function is implemented on an information processing apparatus. However, the present embodiment is not limited thereto. The present embodiment can be carried out even when a plurality of security countermeasure functions are implemented on an information processing apparatus, and similar effects can be obtained even in such case. Besides, when a plurality of security countermeasure functions are implemented on an information processing apparatus, the evaluation point calculation unit 15 can obtain similar effects by carrying out the present embodiment by calculating an ultimate evaluation point by adding, for each countermeasure policy, the evaluation point calculated for each piece of countermeasure policy information regarding each security countermeasure function.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in the present invention includes not only a personal computer but also an arithmetic processing apparatus, a microcomputer, or the like included in an information processing apparatus. The computer is a generic name of an apparatus and a device which can realize the functions of the present invention by a program.

The present invention is not limited to the embodiments. The invention can be embodied by changing the constituent elements in an execution phase without departing from the spirit and scope of the invention. In addition, various inventions can be formed by appropriate combinations of the plurality of constituent elements disclosed in the embodiments. For example, several constituent elements may be deleted from all the constituent elements described in the embodiments. Furthermore, the constituent elements over the different embodiments may be appropriately combined with each other.

What is claimed is:

1. A security countermeasure function evaluation program stored in a non-transitory computer readable storage medium, wherein the security countermeasure function evaluation program is used on and for a security countermeasure function evaluation apparatus for evaluating a security countermeasure function implemented on an information processing apparatus capable of reading and writing a database unit serving as a storage device, the security countermeasure function evaluation program comprising:

a first program code for causing the security countermeasure function evaluation apparatus to execute writing processing for writing, to the database unit, security protection target asset information individually representing a physical body of the information processing apparatus, a function of the information processing apparatus, and data stored in the information processing apparatus and a plurality of pieces of security state information including security condition ID and state information which are individually related to each piece of the security protection target asset information;

a second program code for causing the security countermeasure function evaluation apparatus to execute writing processing for writing, to the database unit, document data including threat information including information about an executioner of a threat and an execution condition, which are a cause of transition of a security condition from a safe state to a dangerous state or a damage occurrence state;

a third program code for causing the security countermeasure function evaluation apparatus to execute writing processing for writing, to the database unit, a sufficient condition evaluation parameter including an option and a point for each of items including presence/non-presence of a function, a time, an effect, a notification range, an operation timing, and a degree of dependence on booting regarding a sufficient condition for executing any countermeasure policy and a countermeasure function evaluation parameter including an option and a point for each of items including presence/non-presence of a function, a time, an effect, a notification range, an operation timing, and a degree of dependence on booting regarding any security countermeasure function;

a fourth program code for causing the security countermeasure function evaluation apparatus to execute writing processing for writing, to the database unit, sufficient condition table model-form information including a countermeasure policy region including countermeasure policy information for reducing an execution condition described in the information about the executioner of the threat and the execution condition, a selection region enumerating options for each of items including presence/non-presence of a function, a time, an effect, a notification range, and the degree of dependence on booting in association with the sufficient condition evaluation parameter regarding execution of countermeasure policy information and a function name for execution, and a point region in which a point according to an option selected by the selection region is written on the basis of the sufficient condition evaluation parameter;

a fifth program code for causing the security countermeasure function evaluation apparatus to execute writing processing for writing, to the database unit, countermeasure model-form information including a countermeasure name region receiving a countermeasure name for identifying a product of a security countermeasure function, a selection region enumerating options for each of items including presence/non-presence of a function, a time, an effect, a notification range, and a degree of dependence on booting in association with the countermeasure function evaluation parameter, regarding a function name for execution and execution for a security countermeasure function of the product identified by the countermeasure name, and a point region in which a point according to an option selected by the selection region, is written on the basis of the countermeasure function evaluation parameter;

a sixth program code for causing the security countermeasure function evaluation apparatus to execute processing for selecting security protection target asset information in the database unit based on a selection command when receiving input of the selection command of a security protection target asset including a specification of the security protection target asset;

a seventh program code for causing the security countermeasure function evaluation apparatus to perform processing for displaying the selected security protection target asset information;

an eighth program code for causing the security countermeasure function evaluation apparatus to execute processing for extracting from the database unit security state information related to the displayed security protection target asset information based on a security condition ID when receiving input of the security condition ID while the security protection target asset information is displayed;

a ninth program code for causing the security countermeasure function evaluation apparatus to execute processing for displaying the extracted security condition ID of the security state information;

a tenth program code for causing the security countermeasure function evaluation apparatus to execute processing for classifying each security condition ID into one of a safe, danger, or damage occurrence group based on a specification when receiving input of the specification about one of the safe, danger, or damage occurrence group for each displayed security condition ID;

an eleventh program code for causing the security countermeasure function evaluation apparatus to execute processing for displaying outer frame information in a format according to the classified group by adding it to the displayed security condition ID;

a twelfth program code for causing the security countermeasure function evaluation apparatus to execute processing for using a form of an arrow extending from the outer frame information according to the safe group to the outer frame information according to the danger or damage occurrence group based on a specification to draw first transition path information between the outer frame information when receiving input of a specification of displayed outer frame information;

a thirteenth program code for causing the security countermeasure function evaluation apparatus to execute processing for using a form of an arrow extending from the outer frame information according to the dangerous group to the outer frame information according to the damage occurrence group based on a specification to draw second transition path information between the outer frame information when receiving input of a specification of displayed outer frame information;

a fourteenth program code for causing the security countermeasure function evaluation apparatus to execute processing for associating the first or second transition path information with the threat information on the basis of a specification when receiving input of a specification of the displayed first or second transition path information and the threat information;

a fifteenth program code for causing the security countermeasure function evaluation apparatus to execute processing for deleting first or second transition path information that is not associated with the threat information, and generating threat occurrence model information including a plurality of pieces of security state information, outer frame information, the first transition path information, the second transition path information, and threat information, which are associated with each other;

a sixteenth program code for causing the security countermeasure function evaluation apparatus to execute processing for generating threat analysis intermediate data by associating transition source security state information, transition destination security state information, and threat information with each other based on the threat occurrence model information and displaying the threat analysis intermediate data;

a seventeenth program code for causing the security countermeasure function evaluation apparatus to execute processing for extracting information about an executioner of a threat and an execution condition from the threat information based on a specification when receiving input of the specification of the executioner of the threat and the execution condition in the threat information in the threat analysis intermediate data while the threat analysis intermediate data are displayed;

an eighteenth program code for causing the security countermeasure function evaluation apparatus to execute processing for generating threat analysis result data in which the transition source security state information, the transition destination security state information, and the extracted information about the executioner of the threat and the execution condition are associated with each other in the threat analysis intermediate data;

a nineteenth program code for causing the security countermeasure function evaluation apparatus to execute writing processing for writing countermeasure policy information to a countermeasure policy region of the sufficient condition table model-form information when receiving input of the countermeasure policy information for reducing an execution condition described in the information about the executioner of the threat and the execution condition in the threat analysis result data;

a twentieth program code for causing the security countermeasure function evaluation apparatus to execute processing for selecting a specified option in a selection region when any one of the options in the selection region is specified regarding execution of countermeasure policy information written to the countermeasure policy region and a function name for execution;

a twenty-first program code for causing the security countermeasure function evaluation apparatus to execute processing for describing, in the point region, a point corresponding to an option selected in a selection region, based on the sufficient condition evaluation parameter;

a twenty-second program code for causing the security countermeasure function evaluation apparatus to execute writing processing for writing, to the database unit, sufficient condition table information including a countermeasure policy region into which countermeasure policy information is input, a selection region in which an option is selected, and a point region describing a point;

a twenty-third program code for causing the security countermeasure function evaluation apparatus to execute writing processing for writing the countermeasure name to the countermeasure name region in the countermeasure model-form information when receiving input of the countermeasure name;

a twenty-fourth program code for causing the security countermeasure function evaluation apparatus to execute processing for selecting a specified option in a selection region when any one of the options in the selection region of the countermeasure model-form information is specified regarding execution of a countermeasure name written to the countermeasure name region and a function name for execution;

a twenty-fifth program code for causing the security countermeasure function evaluation apparatus to execute processing for describing, in a point region of the countermeasure model-form information, a point corresponding to an option selected in the selection region of the countermeasure model-form information, based on the countermeasure function evaluation parameter;

a twenty-sixth program code for causing the security countermeasure function evaluation apparatus to execute writing processing for writing, to the database unit, countermeasure information including a countermeasure name region into which a countermeasure name is input, a selection region in which an option is selected, a point region describing a point, which are generated on the basis of the countermeasure model-form information;

a twenty-seventh program code for causing the security countermeasure function evaluation apparatus to execute processing for calculating a difference obtained by subtracting a point in a point region of sufficient condition table information from a point in a point region of countermeasure information regarding the point region of the same item in the sufficient condition table information and the countermeasure information;

a twenty-eighth program code for causing the security countermeasure function evaluation apparatus to execute processing for performing evaluation result point writing processing for writing a point of an evaluation result for each of the same items in the sufficient condition table information and the countermeasure information, wherein when the difference is equal to or more than 0, the evaluation result is adopted as a point of a positive value, and when the difference is less than 0, the evaluation result is adopted as a point of a value zero;

a twenty-ninth program code for causing the security countermeasure function evaluation apparatus to execute processing for calculating a mean value of points in the evaluation results for respective functions of each piece of countermeasure policy information;

a thirtieth program code for causing the security countermeasure function evaluation apparatus to execute processing for calculating an evaluation point by obtaining a summation of all the mean values for each piece of countermeasure policy information;

a thirty-first program code for causing the security countermeasure function evaluation apparatus to execute processing for calculating a transition probability prior to countermeasure, wherein before a security countermeasure function is implemented on the information processing apparatus, based on the threat analysis result data, a number of the same pieces of transition source security state information is adopted as a denominator value, and a number of the same pieces of transition destination security state information having a common transition source is adopted as a numerator value, and the numerator value is divided by the denominator value, whereby the transition probability prior to countermeasure is calculated;

a thirty-second program code for causing the security countermeasure function evaluation apparatus to execute processing for calculating a transition probability after countermeasure, wherein after a security countermeasure function is implemented on the information processing apparatus, the evaluation point is subtracted from the value of the numerator used for calculating the transition probability prior to countermeasure, and the value of the numerator is thus corrected, and the value of this corrected numerator is divided by the value of the denominator, whereby the transition probability after countermeasure is calculated; and a thirty-third program code for causing the security countermeasure function evaluation apparatus to execute processing for displaying the transition probability prior to countermeasure and the transition probability after countermeasure.

2. The security countermeasure function evaluation program according to claim 1, further comprising:

a thirty-fourth program code for causing the security countermeasure function evaluation apparatus to execute writing processing for writing, to the database unit, a recovery countermeasure policy region including recovery function requirement information indicating recovery countermeasure policies and recovery sufficient condition table model-form information receiving sufficient condition regions receiving recovery sufficient condition information of each of items of a type of log, a target of tracking function, and a backup, regarding the sufficient condition for achieving the recovery function requirement information in the recovery countermeasure policy region;

a thirty-fifth program code for causing the security countermeasure function evaluation apparatus to execute writing processing for writing, to the database unit, a countermeasure name region receiving a countermeasure name for identifying a product of a security countermeasure function and recovery countermeasure model-form information including a selection region representing, as an option, recovery sufficient condition information for each of items of the type of log, the target of tracking function, and the backup, regarding the security countermeasure function of the product identified based on the countermeasure name;

a thirty-sixth program code for causing the security countermeasure function evaluation apparatus to execute processing for extracting security state information, wherein when input of a selection command of a security protection target asset including a specification of the security protection target asset is received, security protection target asset information is selected from the database unit based on the selection command and is displayed, and when input of a security condition ID is received while the security protection target asset information is displayed, the security state information related to the displayed security protection target asset information is extracted from the threat occurrence model information based on the security condition ID;

a thirty-seventh program code for causing the security countermeasure function evaluation apparatus to execute processing for displaying the security condition ID of the security state information extracted from the threat occurrence model information, and when input of a specification of one of safe, danger, and damage occurrence groups is received for each security condition ID, the security condition ID is classified into one of safe, danger, and damage occurrence groups based on this specification, and then, outer frame information in a format according to each group is displayed by adding the outer frame information to the displayed security condition ID;

a thirty-eighth program code for causing the security countermeasure function evaluation apparatus to execute processing for drawing third transition path information between outer frame information in a form of an arrow toward the outer frame information in accordance with each safety group from the outer frame information in a form according to the danger or damage occurrence group based on a specification when receiving input of the specification of the displayed outer frame information;

a thirty-ninth program code for causing the security countermeasure function evaluation apparatus to execute processing for associating the third transition path information and recovery function requirement information when receiving input of the recovery function requirement information for each piece of the third transition path information;

a fortieth program code for causing the security countermeasure function evaluation apparatus to execute processing for generating recovery model information including a plurality of pieces of security state information, outer frame information, the third transition path information, and the recovery function requirement information, which are associated with each other;

a forty-first program code for causing the security countermeasure function evaluation apparatus to execute writing processing for writing recovery sufficient condition information to the sufficient condition region of the recovery sufficient condition table model-form information when receiving input of the recovery sufficient condition information for each of items of the type of log, the target of tracking function, and the backup;

a forty-second program code for causing the security countermeasure function evaluation apparatus to execute writing processing for writing, to the database unit, the recovery sufficient condition table information including the recovery countermeasure policy region and the sufficient condition region into which the recovery sufficient condition information is written;

a forty-third program code for causing the security countermeasure function evaluation apparatus to execute writing processing for writing a countermeasure name to the countermeasure name region in the recovery countermeasure model-form information when receiving input of the countermeasure name for the recovery countermeasure model-form information;

a forty-fourth program code for causing the security countermeasure function evaluation apparatus to execute processing for selecting specified recovery sufficient condition information when receiving the specification of the recovery sufficient condition information as an option in the recovery countermeasure model-form information;

a forty-fifth program code for causing the security countermeasure function evaluation apparatus to execute writing processing for writing, to the database unit, the recovery countermeasure information including the countermeasure name region generated based on the recovery countermeasure model-form information and into which the countermeasure name is input and the selection region in which the recovery sufficient condition information is selected, a forty-sixth program code for causing the security countermeasure function evaluation apparatus to execute recovery evaluation point writing processing for writing a point of an evaluation result for each of the same items in recovery function requirement information in the recovery countermeasure policy region of the recovery sufficient condition table information, wherein when the recovery sufficient condition information in the recovery sufficient condition table information in each of the same items in the recovery sufficient condition table information and in the recovery countermeasure information matches recovery sufficient condition information in the recovery countermeasure information, the evaluation result is adopted as a point of a positive value, and when both do not match each other, the evaluation result is adopted as a point of a value zero;

a forty-seventh program code for causing the security countermeasure function evaluation apparatus to execute processing for calculating an evaluation point by obtaining a summation of points of all the evaluation results for each recovery function requirement;

a forty-eighth program code for causing the security countermeasure function evaluation apparatus to execute processing for processing for calculating a transition probability prior to countermeasure, wherein before a security countermeasure function is implemented on the information processing apparatus, based on the recovery model information, a number of pieces of recovery function requirement information related to the same transition source security state information is adopted as a denominator value, and a number of pieces of recovery function requirement information related to the same transition destination security state information having the common transition source is adopted as a numerator value, and the numerator value is divided by the denominator value, whereby the transition probability prior to countermeasure is calculated;

a forty-ninth program code for causing the security countermeasure function evaluation apparatus to execute processing for calculating a transition probability after countermeasure, wherein after a security countermeasure function is implemented on the information processing apparatus, the value of the numerator used for calculating the transition probability prior to countermeasure is multiplied by the evaluation point of the recovery evaluation point writing processing, and the value of the numerator is thus corrected, and the value of this corrected numerator is divided by the value of the denominator serving as the number of pieces of recovery function requirement information, whereby the transition probability after countermeasure is calculated; and a fiftieth program code for causing the security countermeasure function evaluation apparatus to execute processing for displaying the transition probability prior to countermeasure and the transition probability after countermeasure based on the recovery model information.

3. The security countermeasure function evaluation program according to claim 2, wherein when the recovery evaluation point writing processing adopts the evaluation result as a point of a positive value, the recovery evaluation point writing processing includes processing for adopting a weighting value set for each item in advance as the point of the evaluation result.

4. The security countermeasure function evaluation program according to claim 1, wherein when the evaluation result point writing function adopts the evaluation result as a point of a positive value, a function may be provided to adopt a weighting value set for each item in advance as the point of the evaluation result.

5. The security countermeasure function evaluation program according to claim 1, wherein when a plurality of security countermeasure functions are implemented on the information processing apparatus, the security countermeasure function evaluation program further includes program code for causing the security countermeasure function evaluation apparatus to execute processing for calculating an ultimate evaluation point by adding, for each piece of countermeasure policy information, the evaluation point calculated for each piece of countermeasure policy information regarding each security countermeasure function.

* * * * *